United States Patent
Damnjanovic et al.

(10) Patent No.: US 10,015,691 B2
(45) Date of Patent: Jul. 3, 2018

(54) CHANNEL STATE INFORMATION PROCEDURE FOR ENHANCED COMPONENT CARRIERS

(71) Applicant: QUALCOMM Incorporated, San Diego, CA (US)

(72) Inventors: Jelena Damnjanovic, Del Mar, CA (US); Aleksandar Damnjanovic, Del Mar, CA (US); Taesang Yoo, Riverside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 321 days.

(21) Appl. No.: 14/883,487

(22) Filed: Oct. 14, 2015

(65) Prior Publication Data

US 2016/0112892 A1    Apr. 21, 2016

Related U.S. Application Data

(60) Provisional application No. 62/064,953, filed on Oct. 16, 2014.

(51) Int. Cl.
*H04W 24/10* (2009.01)
*H04L 1/00* (2006.01)
(Continued)

(52) U.S. Cl.
CPC ........... *H04W 24/10* (2013.01); *H04L 1/0026* (2013.01); *H04L 5/0048* (2013.01); *H04W 72/0446* (2013.01)

(58) Field of Classification Search
None
See application file for complete search history.

(56) References Cited

U.S. PATENT DOCUMENTS

2013/0077514 A1* 3/2013 Dinan ............... H04L 5/0057 370/252
2013/0155974 A1 6/2013 Papasakellariou et al.
(Continued)

FOREIGN PATENT DOCUMENTS

| EP | 2015601 A1 | 1/2009 |
| WO | WO-2009060164 A1 | 5/2009 |
| WO | WO-2010036177 A1 | 4/2010 |

OTHER PUBLICATIONS

ISA/EPO, International Search Report and Written Opinion of the International Searching Authority, Int'l Appl. No. PCT/US2015/055786, dated Dec. 18, 2015, European Patent Office, Rijswijk, NL, 14 pgs.

(Continued)

*Primary Examiner* — Edan Orgad
*Assistant Examiner* — Saumit Shah
(74) *Attorney, Agent, or Firm* — Anthony R. Morris

(57) ABSTRACT

Techniques are provided for transmitting reference signals and CSI reports within a wireless communications system using variable length downlink or uplink transmission time intervals (TTIs). CSI reference signals and CSI reports may be transmitted at times that accommodate the variable length TTIs. A UE may receive signaling that indicates when a CSI reference signal is to be transmitted, and when a CSI report is to be transmitted to a base station. CSI reporting may be performed periodically using a physical uplink control channel (PUCCH) in designated uplink symbols, may be aperiodic using a physical uplink shared channel (PUSCH), or a combination thereof. A UE may receive signaling indicating periodic CSI reporting, aperiodic CSI reporting, or both. Such signaling may be received, for example, via radio resource control (RRC) signaling or within a downlink or uplink grant.

22 Claims, 17 Drawing Sheets

(51) Int. Cl.
*H04L 5/00* (2006.01)
*H04W 72/04* (2009.01)

(56) References Cited

U.S. PATENT DOCUMENTS

2014/0071954 A1   3/2014  Au et al.
2014/0126476 A1*  5/2014  Kang ................... H04L 1/0026
                                                      370/328

OTHER PUBLICATIONS

NTT Docomo, Inc., "Variable TTI Length Control," 3GPP TSG RAN WG2 Ad Hoc on LTE, Cannes, France, R2-061921, Jun. 27-30, 2006, 3 pgs., 3rd Generation Partnership Project.
IPEA/EP, Second Written Opinion of the International Preliminary Examining Authority, Int'l Application No. PCT/US2015/055786, dated Sep. 15, 2016, European Patent Office, Munich, DE, 10 pgs.

* cited by examiner

CHANNEL STATE INFORMATION PROCEDURE FOR ENHANCED COMPONENT CARRIERS

CROSS REFERENCES

The present Application for Patent claims priority to U.S. Provisional Patent Application No. 62/064,953 by Damnjanovic et al., entitled "Channel State Information Procedure for Enhanced Component Carriers," filed Oct. 16, 2014, assigned to the assignee hereof, and expressly incorporated by reference herein.

BACKGROUND

The present disclosure, for example, relates to wireless communication systems, and more particularly to reporting of channel state information in a system employing variable length transmission time intervals.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple communication devices, otherwise known as user equipment's (UEs). A base station may communicate with UEs on downlink channels (e.g., for transmissions from a base station to a UE) and uplink channels (e.g., for transmissions from a UE to a base station).

These multiple access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology.

In some instances, one or more parameters used for wireless communications may be determined, at least in part, by the channel conditions associated with a particular communications channel being used by a UE and base station for wireless communications. Channel state information may be estimated, in some instances, by a UE that receives a reference signal from a base station. This channel state information (CSI) may be periodically transmitted in a CSI report from the UE to the base station. In situations where the uplink and downlink transmission status of a system may be modified dynamically, reporting of CSI at set time intervals may result in conflicts between a scheduled CSI report transmission, which is to be transmitted in an uplink transmission from the UE to the base station, and a dynamically scheduled downlink transmission from the base station to the UE. Thus, flexible transmissions of CSI reports may enhance the efficiency of such systems.

SUMMARY

The described features generally relate to one or more improved systems, methods, and/or devices for transmitting reference signals and CSI reports within a wireless communications system. In some examples, base stations and UEs within the wireless communications system may use variable length downlink or uplink transmission time intervals (TTIs). CSI reference signals and CSI reports may be transmitted at times that accommodate the variable length TTIs. In some examples, a UE may receive signaling that indicates when a CSI reference signal is to be transmitted by a base station and when a CSI report is to be transmitted to a base station. CSI reporting may be performed periodically using a physical uplink control channel (PUCCH) in designated uplink symbols or may be aperiodic using a physical uplink shared channel (PUSCH). A UE may receive signaling indicating periodic CSI reporting, aperiodic CSI reporting, or both. Such signaling may be received, for example, via radio resource control (RRC) signaling or within a downlink or uplink grant.

According to a first set of illustrative examples, a method for wireless communication is described. In one example, the method may include receiving one or more downlink reference signals in a variable length downlink transmission time interval (TTI), estimating channel state information (CSI) for one or more of the downlink reference signals, and identifying at least a portion of the estimated CSI for transmission in a CSI report in a variable length uplink TTI.

According to the first set of examples, an apparatus for wireless communication is described. In one configuration, the apparatus may include means for receiving one or more downlink reference signals in a variable length downlink TTI, means for estimating CSI for one or more of the downlink reference signals, and means for identifying at least a portion of the estimated CSI for transmission in a CSI report in a variable length uplink TTI.

According to the first set of examples, another apparatus for wireless communication is described. In one configuration, the apparatus may include a processor; memory in electronic communication with the processor; and instructions stored in the memory. The instructions may be executable by the processor to cause the apparatus to: receive one or more downlink reference signals in a variable length downlink TTI, estimate CSI for one or more of the downlink reference signals, and identify at least a portion of the estimated CSI for transmission in a CSI report in a variable length uplink TTI.

According to the first set of examples, a non-transitory computer-readable medium storing computer-executable code for wireless communication is described. In one configuration, the code may be executable to receive one or more downlink reference signals in a variable length downlink TTI, estimate CSI for one or more of the downlink reference signals, and identify at least a portion of the estimated CSI for transmission in a CSI report in a variable length uplink TTI.

In some aspects of the method, apparatuses, and/or non-transitory computer-readable medium of the first set of examples, the variable length downlink TTI may include a variable number of downlink symbols. The receiving of the downlink reference signals, in some examples, may also include receiving an uplink grant that includes a variable number of uplink symbols and an indication that the CSI report is to be transmitted on a physical uplink shared channel (PUSCH) in one or more of the uplink symbols. In other examples, the receiving may also include receiving signaling that includes a periodicity and an offset to be used for identifying when the CSI report is to be transmitted. Such signaling may include, for example, radio resource control (RRC) signaling. In some examples, an initial symbol for transmission of the CSI report may be configured as a downlink symbol, and wherein a subsequent uplink symbol for transmission of the CSI report may be determined as a first available uplink symbol following the initial symbol.

In some aspects of the method, apparatuses, and/or non-transitory computer-readable medium of the first set of examples, it may be determined that an initial symbol for transmission of the CSI report is configured as a downlink symbol and the transmission of the CSI report may be skipped, and a subsequent symbol may be identified for transmission of a subsequent CSI report for a reference signal received in one or more subsequent downlink symbol. In some examples, the CSI report may be transmitted on one or more of a physical uplink control channel (PUCCH) or a PUSCH, wherein the transmission on the PUCCH or PUSCH is determined based on one or more UE capability, RRC configuration of the UE, and whether the UE receives an uplink UL grant to transmit PUSCH data during the uplink TTI.

In a second set of illustrative examples, a method for wireless communication is described. In one configuration, the method may include identifying one or more downlink symbols for transmission of CSI during a variable length downlink TTI that comprises a variable number of downlink symbols, transmitting signaling indicating the identified one or more downlink symbols, transmitting a CSI reference signal over the identified one or more downlink symbols, and receiving a CSI report based at least in part on the transmitted CSI reference signal.

According to the second set of examples, an apparatus for wireless communication is described. In one configuration, the apparatus may include means for identifying one or more downlink symbols for transmission of CSI during a variable length downlink TTI that comprises a variable number of downlink symbols, means for transmitting signaling indicating the identified one or more downlink symbols, means for transmitting a CSI reference signal over the identified one or more downlink symbols, and means for receiving a CSI report based at least in part on the transmitted CSI reference signal.

According to the second set of examples, an apparatus for wireless communication is described. In one configuration, the apparatus may include a processor, memory in electronic communication with the processor, and instructions stored in the memory. The instructions may be executable by the processor to cause the apparatus to: identify one or more downlink symbols for transmission of CSI during a variable length downlink TTI that comprises a variable number of downlink symbols, transmit signaling indicating the identified one or more downlink symbols, transmit a CSI reference signal over the identified one or more downlink symbols, and receive a CSI report based at least in part on the transmitted CSI reference signal.

According to the second set of examples, a non-transitory computer-readable medium storing computer-executable code for wireless communication is described. In one configuration, the code may be executable to identify one or more downlink symbols for transmission of CSI during a variable length downlink TTI that comprises a variable number of downlink symbols, transmit signaling indicating the identified one or more downlink symbols, transmit a CSI reference signal over the identified one or more downlink symbols, and receive a CSI report based at least in part on the transmitted CSI reference signal.

In some aspects of the method, apparatuses, and/or non-transitory computer-readable medium of the second set of examples, the one or more identified downlink symbol may include one or more designated symbols. In some examples, the transmitted signaling may also include an indication of the one or more designated symbols to at least one UE. The indication of the one or more designated symbols may be transmitted, for example, in RRC signaling that includes a periodicity and an offset to be used for identifying the one or more designated symbols.

In some aspects of the method, apparatuses, and/or non-transitory computer-readable medium of the second set of examples, it may be determined that an initial uplink symbol for transmission of the CSI report is configured as a downlink symbol, and a variable uplink symbol for transmission of the CSI report may be identified as a first available uplink symbol following the initial uplink symbol. In certain examples, the signaling indicating the identified one or more downlink symbols may include an uplink grant with an identified number of variable number of uplink symbols for transmitting uplink data, with one or more uplink symbols identified for transmission of the CSI report, and signaling may be transmitted, as part of the uplink grant, indicating the identified one or more downlink symbols and the identified one or more uplink symbols.

In some aspects of the method, apparatuses, and/or non-transitory computer-readable medium of the second set of examples, the CSI report may be received on a physical uplink control channel (PUCCH). In certain examples, the CSI report may be multiplexed with data received on a physical uplink shared channel (PUSCH).

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques are described for transmitting channel state information (CSI) reference signals and CSI reports within a system that utilizes variable length transmission time intervals (TTIs). CSI reference signals and CSI reports may be transmitted at times that accommodate the variable length TTIs. In some examples, a UE may receive signaling that indicates when a CSI reference signal is to be transmitted by a base station and when a CSI report is to be transmitted to a base station. CSI reporting may be performed periodically using a physical uplink control channel (PUCCH) in designated uplink symbols, or may be aperiodic using a physical uplink shared channel (PUSCH). A UE may receive signaling indicating periodic CSI reporting, aperiodic CSI reporting, or both. Such signaling may be received, for example, via radio resource control (RRC) signaling or within a downlink or uplink grant.

In some examples, a UE may receive one or more downlink reference signals in a variable length downlink TTI, estimate CSI for one or more of the downlink reference signals, and identify at least a portion of the estimated CSI for transmission in a CSI report in a variable length uplink TTI. For example, a UE may receive a CSI reference signal in a downlink symbol from the base station and may receive an uplink grant having a variable number of uplink symbols and an indication that the CSI report is to be transmitted on a PUSCH in one or more of the uplink symbols. In other examples, a UE may receiving signaling (e.g., via RRC signaling) that includes a periodicity and an offset to be used for identifying when the CSI report is to be transmitted.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
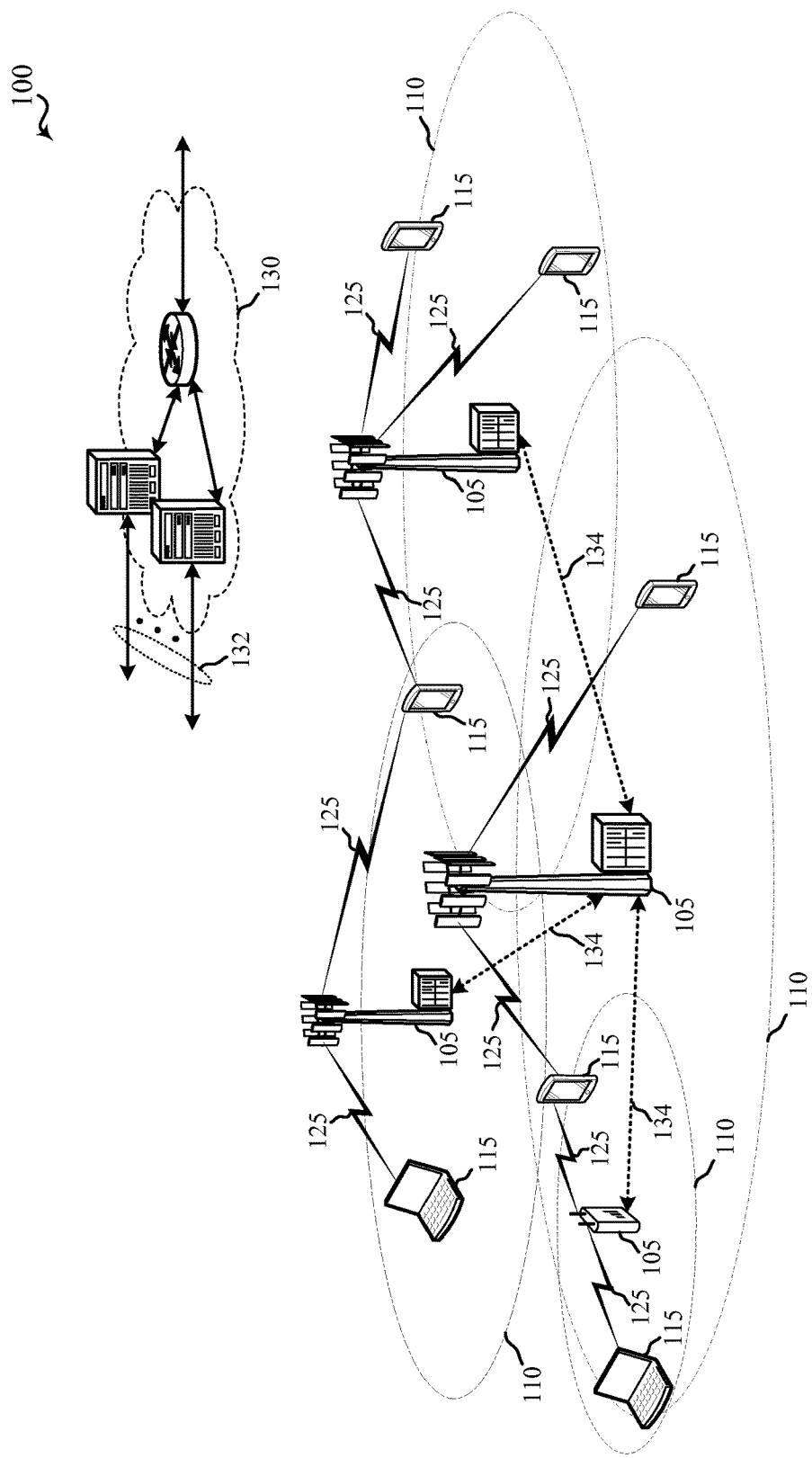
FIG. 1 shows a block diagram of a wireless communication system, in accordance with various aspects of the present disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through backhaul links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 110 for a base station 105 may be divided into sectors making up a portion of the coverage area (not shown). The wireless communications system 100 may include base stations 105 of different types (e.g., macro and/or small cell base stations). There may be overlapping geographic coverage areas 110 for different technologies.

In some examples, at least a portion of the wireless communications system 100 may be configured to operate using variable length TTIs, in which downlink and uplink TTIs may be dynamically adjusted to provide flexibility to dynamically adapt to particular traffic conditions at a particular moment. Certain reference signal transmissions, such as CSI reference signals, may be transmitted at particular times or may be transmitted at variable times. Likewise, certain reports from a UE 115 to base station 105 may be transmitted at particular times or may be transmitted at variable times. A base station 105 may designate certain periodic uplink and downlink resources for such reference signal transmission and reporting and transmit signaling (e.g., RRC signaling, signaling in a system information block (SIB), or PDCCH signaling) to the UEs 115 to indicate the designated resources. Additionally or alternatively, a base station 105 may provide for aperiodic reference signal transmission and reporting, such as an indication in a downlink grant to a UE 115 that a CSI report is to be transmitted using particular uplink resources. A UE 115, in such examples, may receive a CSI reference signal, estimate channel state information based on the CSI reference signal, generate a CSI report, and transmit at least a portion of the CSI report using the assigned uplink resources. Such variable length TTIs and CSI reporting will be described in more detail below.

In some examples, the wireless communications system 100 is an LTE/LTE-A network. In LTE/LTE-A networks, the term evolved Node B (eNB) may be generally used to describe the base stations 105, while the term UE may be generally used to describe the UEs 115. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a 3GPP term that can be used to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARQ) to provide retransmission at the MAC layer to improve link efficiency. In the control plane, the Radio Resource Control (RRC) protocol layer may provide establishment, configuration, and maintenance of an RRC connection between a UE 115 and the base stations 105 or core network 130 supporting radio bearers for the user plane data. At the Physical (PHY) layer, the transport channels may be mapped to Physical channels.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Figure 2:
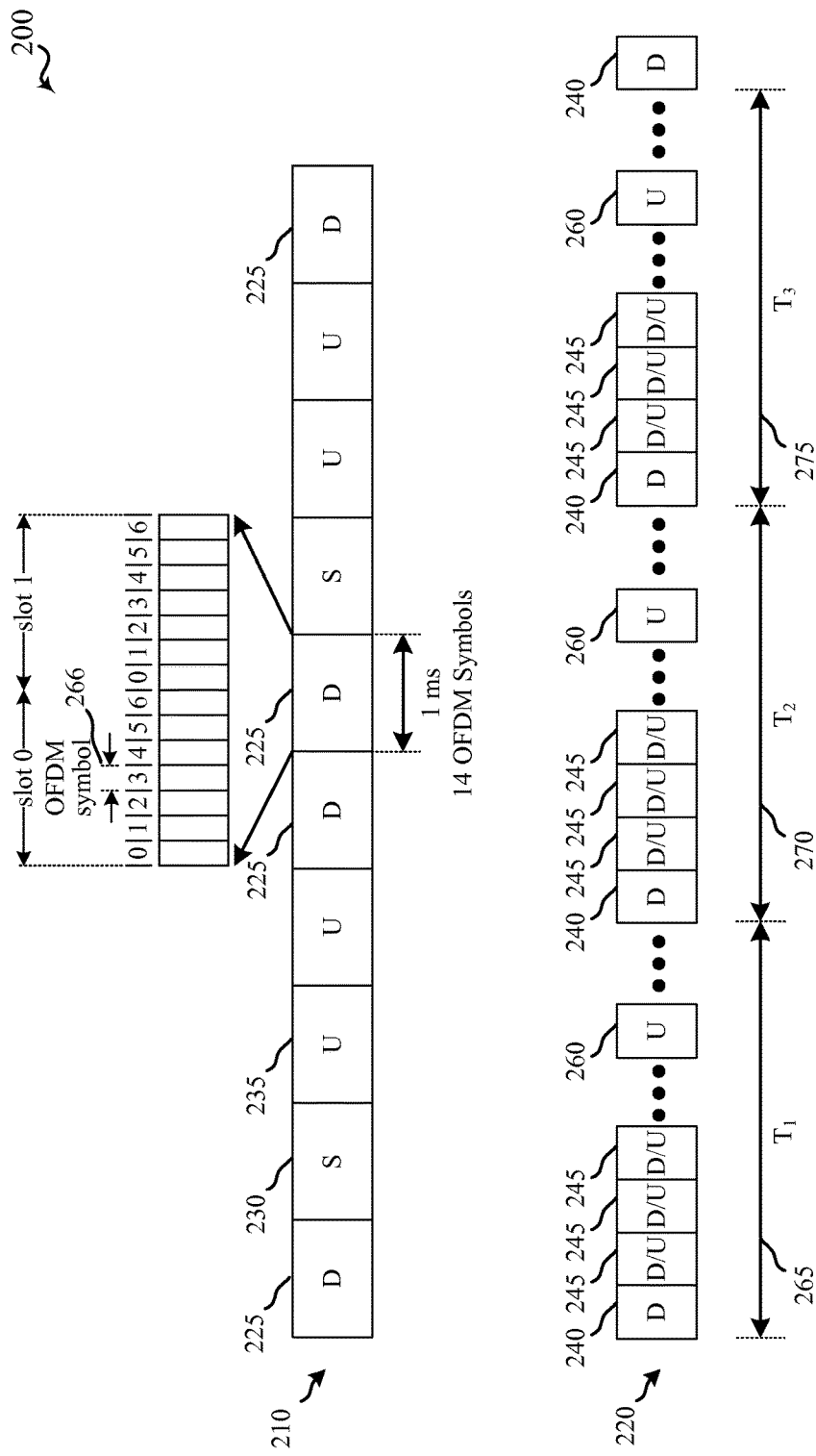
FIG. 2 is a diagram illustrating an example of primary cell and secondary cell frame structures that may be used in a wireless communication system, in accordance with an aspect of the present disclosure.

As discussed above, various examples provide communications in a wireless communications system, such as wireless communications system 100 of FIG. 1 that utilize variable TTIs. FIG. 2 is a block diagram 200 conceptually illustrating an example of radio frames and different subframes that may be transmitted using different cells of a wireless communication system, such as wireless communications system 100 of FIG. 1, in accordance with aspects of the present disclosure. The radio frames of FIG. 2 may be transmitted using portions of the wireless communications system 100 described with reference to FIG. 1 between one or more base stations 105 and one or more UEs 115, for example. In this example, a legacy primary cell (PCell) transmission 210 may include a TDD frame that include ten 1 ms subframes that include downlink subframes 225, special subframes 230, and uplink subframes 235. The downlink subframes 225, special subframes 230, and uplink subframes 235 may include a subframe structure defined according to established LTE standards, which may include 14 symbols 266 within each 1 ms subframe. In some examples, downlink subframes 225 may include downlink orthogonal frequency division multiplexing (OFDM) symbols, uplink subframes may include single carrier frequency division multiplexing (SC-FDM) symbols, and special subframes 230 may include both uplink SC-FDM symbols and downlink OFDM symbols.

In the example of FIG. 2, secondary cell (SCell) transmissions 220 may include low latency or burst mode transmissions that may replace the legacy frame structure with a TDD-based frame structure that allows for dynamic switching between downlink and uplink symbols and for variable TTI lengths. While the example of FIG. 2 shows the low latency or burst mode transmissions on a SCell, it will be understood that such transmission structures, as well as the various techniques and principles described herein, may be implemented in other transmissions, such as within one or more burst mode subframes of a legacy LTE frame, in other PCell transmissions, in licensed or unlicensed spectrum, etc. In the example of FIG. 2, the SCell transmissions 220, which may be referred to as enhanced component carrier (eCC) transmissions, may include designated downlink symbols 240, designated uplink symbols 260, and flexible symbols 245 that may be allocated as uplink or downlink symbols based on particular traffic conditions.

The designated downlink symbols 240 and designated uplink symbols 260 may be provided to enable various radio resource management (RRM) measurements, synchronization, CSI feedback, random access channel (RACH) and scheduling request (SR) communications, for example. The designated downlink symbols 240 and designated uplink symbols 260 may be configured by a base station, such as base stations 105 of FIG. 1, and may be communicated to one or more UEs, such as UEs 115 of FIG. 1, via one or more of RRC signaling, a system information block (SIB), or PDCCH signaling. As mentioned, flexible symbols 245 may be switched to be uplink or downlink symbols, and the indication of such configurations may be provided by a base station in an allocation of uplink or downlink resources that is provided to a UE. Based on such an allocation, the UE may determine that a certain number of symbols 240, 245, 260 may be allocated for communications between the UE and the base station.

With such dynamic switching of symbols, a base station and UE may be freed from looking ahead in terms of a number of uplink or downlink subframes for an entire radio frame, and instead may determine particular resource allocations in a dynamic and flexible manner. The number of resources allocated for a particular UE may be determined, for example, on an amount of data to be transmitted between the UE and the base station, a latency configuration, or quality of service (QoS) threshold associated with the data. In some examples, each of the symbols 240, 245, and 260 may have a reduced symbol duration relative to the legacy OFDM or SC-FDM symbols (e.g., symbols 266), and in some examples have a symbol duration of 11.36 μs per symbol, including a useful symbol duration of 8.33 μs and a cyclic prefix duration of 2.03 μs. Symbols 240, 245, and 260 may have increased tone spacing for subcarriers relative to legacy symbols, and in some examples have a tone spacing of 120 kHz, and utilize a relatively wide bandwidth (e.g., 80 MHz).

Such shortened symbol duration and dynamic switching between downlink and uplink communications may allow for reduced acknowledgment/negative acknowledgment (ACK/NACK) turn-around time, and may thus provide relatively low latency transmissions of data. In some examples, delay sensitive data may be transmitted using SCell transmissions 220, while other data that is not as delay sensitive may be transmitted using PCell transmissions 210. In some examples, a number of symbols 240, 245, and 260 may be allocated to a first UE for a first time period ($T_1$) 265, and may be allocated to the first UE or one or more other UEs during a second time period ($T_2$) 270 and third time period ($T_3$) 275. The length of such time periods 265, 270, 275 may be determined according to one or more of a variety of factors such as, for example, an amount of data to be transmitted, a QoS associated with the data, a delay configuration of the data, the number of other UEs present, or channel conditions, to name but a few.

Figure 3:
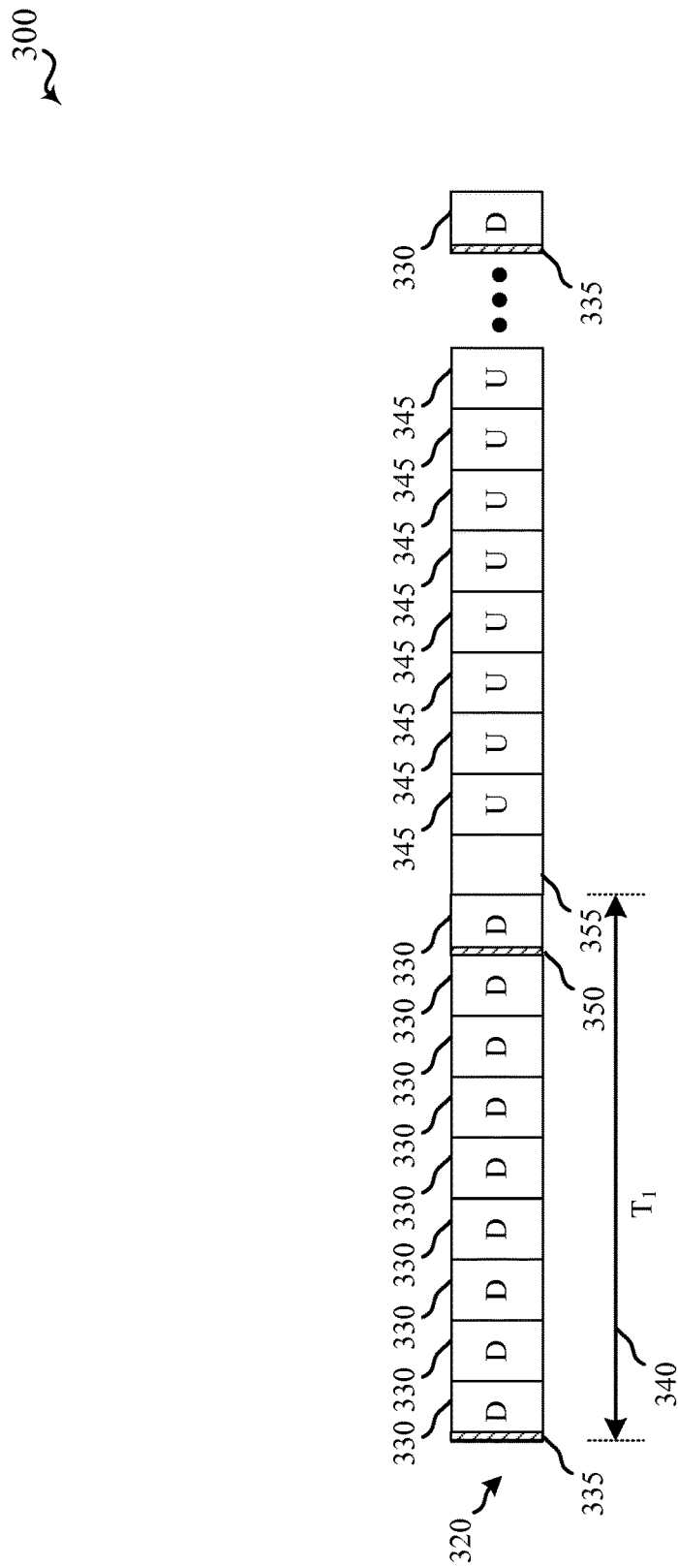
FIG. 3 is a diagram illustrating an example of dynamic downlink and uplink grants and associated downlink and uplink transmission symbols of a wireless communication system, in accordance with an aspect of the present disclosure.

With reference now to FIG. 3, a block diagram 300 conceptually illustrating an example of enhanced component carrier (eCC) transmissions is discussed. In the example of FIG. 3, eCC transmissions 320 may include a number of symbols allocated as uplink or downlink symbols. Such eCC transmissions 320 may be transmitted using different cells of a wireless communication system, such as wireless communications system 100 of FIG. 1, in accordance with aspects of the present disclosure. In some examples, eCC transmissions 320 are transmitted on a SCell such as discussed above with respect to FIG. 2. In the example of FIG. 3, a first time period ($T_1$) 340 may include a downlink grant of nine symbols 330. In this example, an initial downlink symbol 330 may include control information 335, which may be dynamic, and may indicate resource allocations for an upcoming time period (e.g., $T_1$ 340).

In some examples, the control information 335 may include a downlink grant of resources to a UE that include the subsequent symbols 330. In this example, a subsequent transmission of control information 350 may include an uplink grant of eight uplink symbols 345. A blank symbol 355 may be included between a downlink symbol 330 and an uplink symbol 345 to allow time for switching at a UE.

In some examples, bundles of symbols 330 and symbols 345 may be allocated to a UE by a base station, with a length of such bundles controlled by dynamic control information 335 and control information 350. A relatively large number of symbols may be allocated to provide enhanced efficiency in some examples that are somewhat less delay sensitive.

Figure 4:
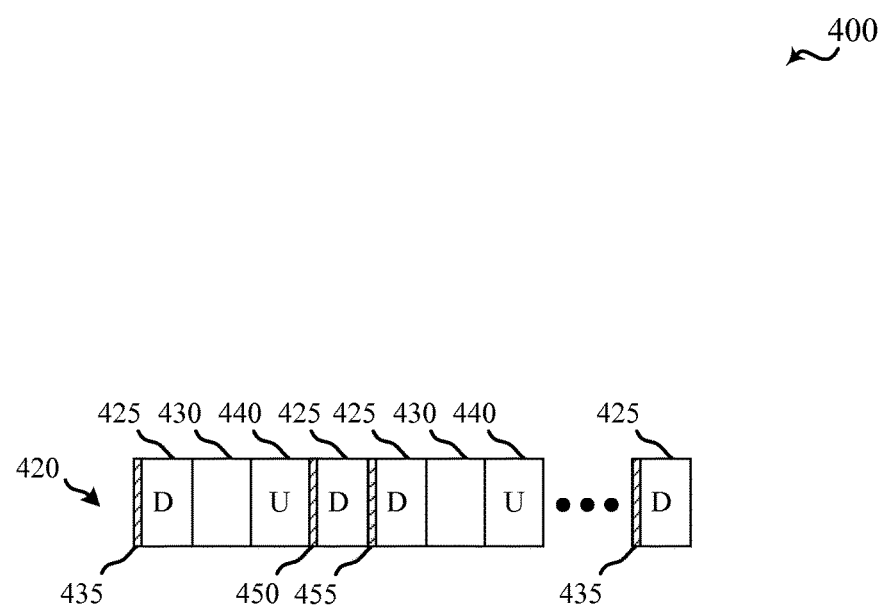
FIG. 4 is a diagram illustrating another example of dynamic downlink and uplink grants and associated downlink and uplink transmission symbols of a wireless communication system, in accordance with an aspect of the present disclosure.

In other examples, if data transmissions are relatively delay sensitive, dynamic grants to a particular UE may be relatively short in order to provide for reduced ACK/NACK turn-around times. FIG. 4 illustrates an example 400 of relatively short grants. In this example, eCC transmissions 420 may include resource allocations of one or two symbols. The eCC transmissions 420 of FIG. 4 may be transmitted using a wireless communication system, such as wireless communications system 100 of FIG. 1, in accordance with aspects of the present disclosure. In some examples, eCC transmissions 420 are transmitted on a SCell such as discussed above with respect to FIGS. 2 and 3. In this example, control information 435 in the initial downlink symbol 425 may include a downlink grant of one symbol (i.e., TTI=1 symbol) and an uplink grant of one symbol (i.e., TTI=1 symbol). The uplink grant, in various examples, may take effect at a two symbol minimum from the receipt of the control information 435 in order to accommodate blank symbol 430 and allow for switching at the UE to transmit uplink symbol 440. In this example, eCC transmissions 420 include a transmission of second control information 450 which, in this example, is a downlink grant for two symbols (e.g., TTI=2 symbols), with third control information 455 providing a subsequent uplink grant which may have a TTI of one or more uplink symbols 440.

Figure 5:
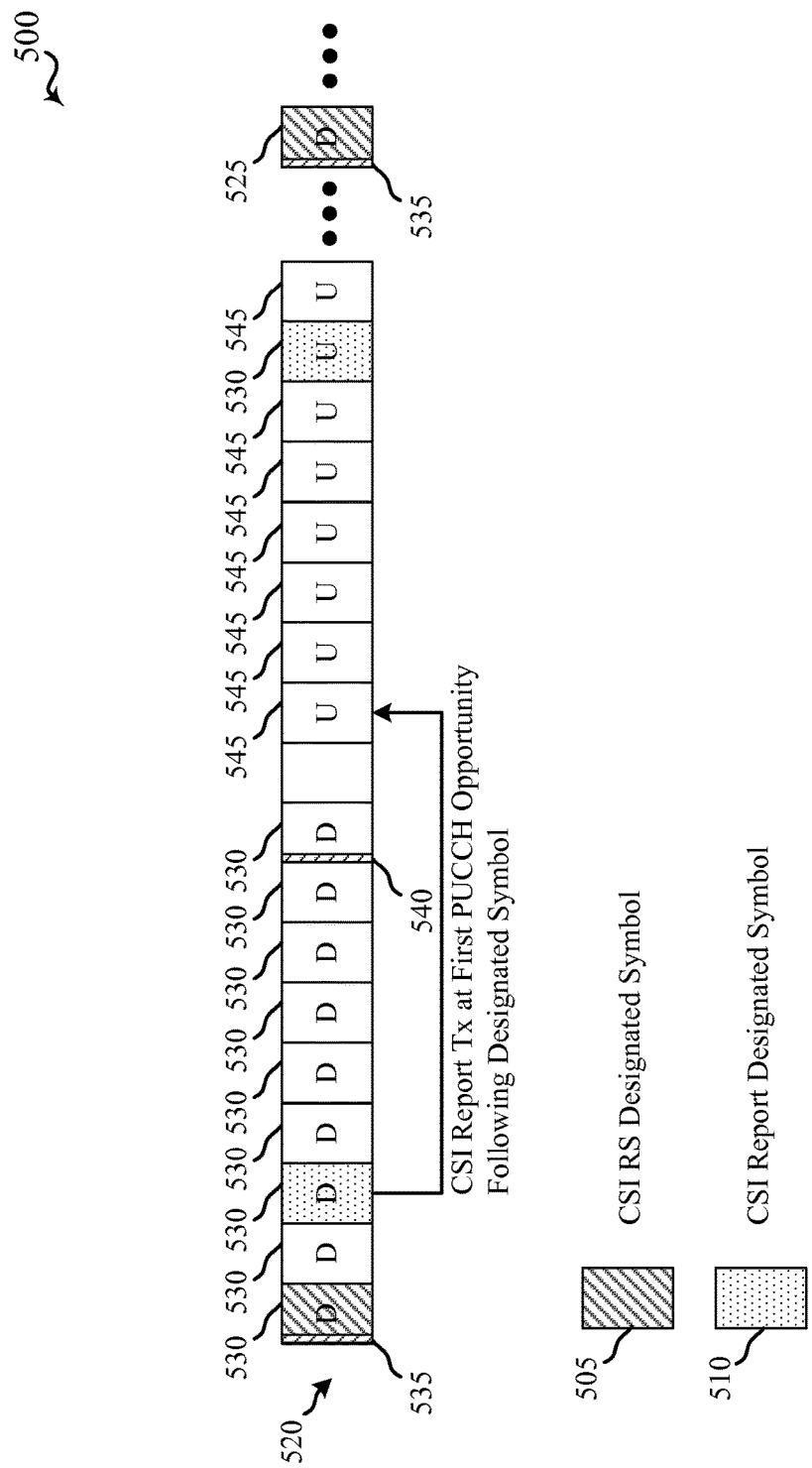
FIG. 5 is a diagram illustrating an example of designated downlink symbols for transmission of CSI reference signals, designated uplink symbols for transmission of CSI reports, and alternative symbols for such transmissions, in accordance with an aspect of the present disclosure.

As mentioned above, various examples provide that CSI may be estimated by a UE and transmitted to a base station based on a CSI reference signal that is transmitted from the base station to the UE. With reference now to FIG. 5, an example 500 of CSI reference signal transmission and CSI report transmissions within eCC transmissions 520 is discussed. The eCC transmissions 520 of FIG. 5 may be transmitted using a wireless communication system, such as wireless communications system 100 of FIG. 1, in accordance with aspects of the present disclosure. In some examples, eCC transmissions 520 are transmitted on a SCell such as discussed above with respect to one or more of FIG. 2, 3, or 4.

In the example of FIG. 5, CSI reference signals (RS) may be transmitted in designated CSI RS symbols 505. In some examples, the downlink designated symbols 505 may be provided to UEs via, for example, RRC signaling. In some examples, such RRC signaling may indicate that the CSI RS will be transmitted during a particular downlink symbol in a downlink grant (e.g., first downlink symbol), referred to as the offset, and also may indicate a periodicity for CSI RS transmissions (e.g., every 6 downlink symbols). The periodicity and offset may be defined with respect to a common timing reference that is independent from a timing of the start of a variable length TTI, and the periodicity and offset may be used to determine which uplink variable length TTI the CSI report will be actually transmitted. While RRC signaling is used in certain examples, it will be understood that other types of signaling may be used to provide information on designated symbols, such as SIB or PDCCH signaling, for example.

In response to receiving a CSI RS, a UE may estimate CSI and generate a CSI report. In some examples, the CSI report may be transmitted to a base station in one or more CSI report designated symbols 510. The CSI report designated symbols 510 may be provided to the UEs according to any of the techniques discussed above for signaling the CSI RS designated symbols 505. If a symbol for periodic CSI reporting turns out to be a downlink symbol 530, a UE may skip the reporting, according to some examples, or may transmit the CSI report at a first PUCCH transmission opportunity following the CSI report designated symbol 510. In the example of FIG. 5, a CSI RS may be transmitted in first downlink symbol 525, which may also include a downlink grant 535 that allocates nine downlink symbols 530 to the UE.

In this example, CSI report designated symbol 510 is a downlink symbol 530, and thus the UE may transmit the CSI report at the first available PUCCH transmission opportunity in an uplink symbol 545. In the example of FIG. 5, an uplink grant 540 may be provided to the UE, following which uplink symbols and the CSI report may be transmitted. In some examples, the CSI report may be transmitted in a PUCCH or PUSCH transmission, as may be defined in RRC signaling. Whether a UE transmits the report on the PUCCH or PUSCH may be determined based on one or more factors, such as an amount of data to be transmitted, availability of a PUCCH or PUSCH transmission, UE capability (e.g., UE supporting/being configured for simultaneous PUSCH+ PUCCH transmission), and existence of PUSCH in that UL TTI (i.e., whether the UE is scheduled for PUSCH transmission), to name a few examples.

Figure 6:
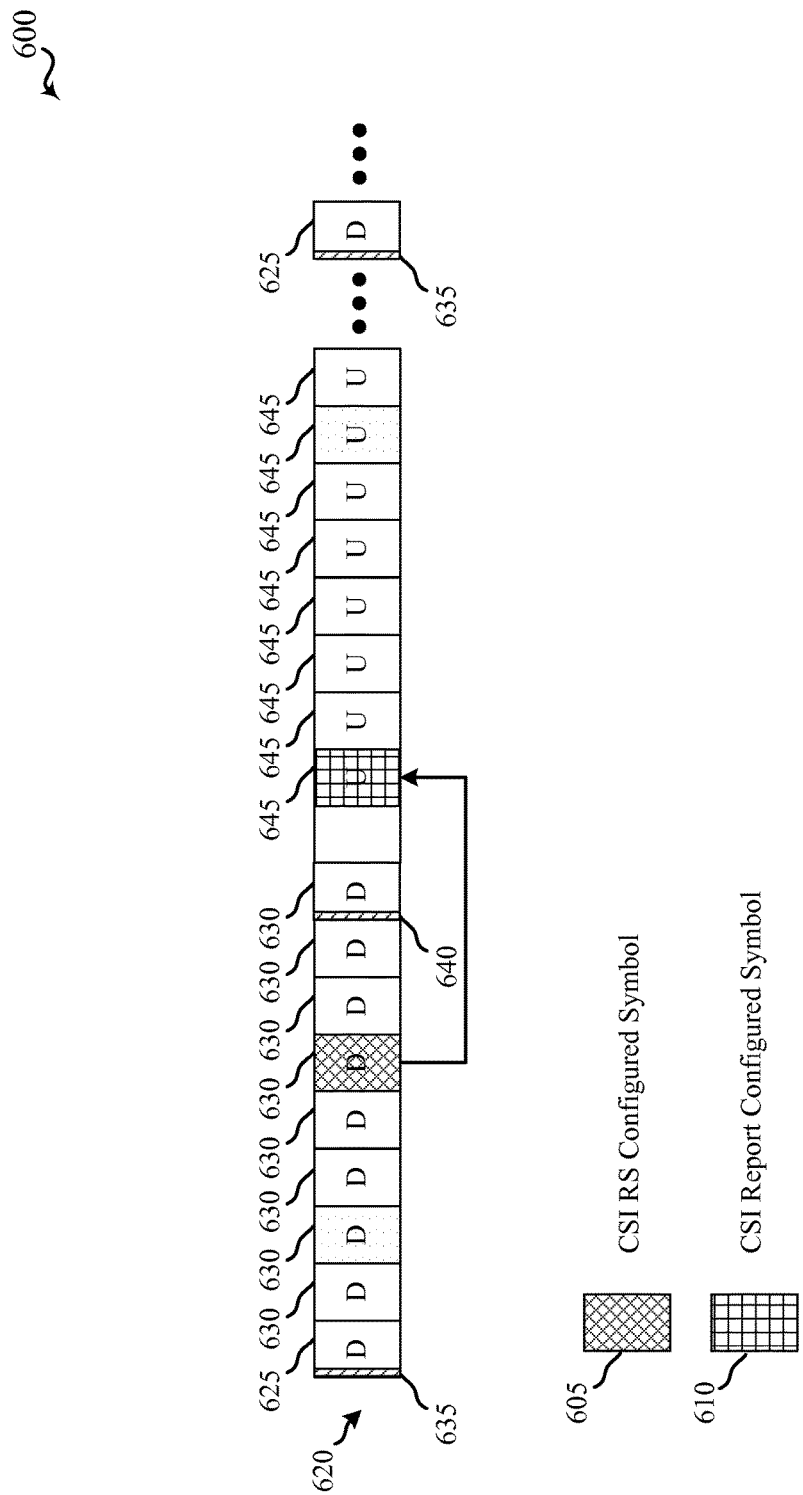
FIG. 6 is a diagram illustrating an example of semi-statically or dynamically configured downlink symbols for transmission of CSI reference signals and uplink symbols for transmission of CSI reports, in accordance with an aspect of the present disclosure.

In other examples, CSI reporting may be performed aperiodically using a PUSCH. With reference now to FIG. 6, another example 600 of CSI reference signal transmission and CSI report transmissions within eCC transmissions 620 is discussed. The eCC transmissions 620 of FIG. 6 may be transmitted using a wireless communication system, such as wireless communications system 100 of FIG. 1, in accordance with aspects of the present disclosure. In some examples, eCC transmissions 620 are transmitted as an eCC on a SCell such as discussed above with respect to one or more of FIG. 2, 3, 4 or 5. The eCC transmissions 620 may contain downlink symbols 630 and uplink symbols 645 during which data may be transmitted. A first downlink symbol 625 may contain a downlink grant 635.

In the example of FIG. 6, CSI reference signals may be transmitted in configured CSI RS symbols 605. In some examples, the configured CSI RS symbols 605 may be provided to UEs via a downlink grant 635. Further, in the example of FIG. 6, CSI reports may be transmitted in CSI report configured symbols 610, which may be provided to UEs in an uplink grant 640. In some examples, a combination of configured symbols 605, 610 and designated symbols 505, 510 may be used for CSI RS and reporting transmissions. Similarly, as discussed above, in response to receiving a CSI RS, a UE may estimate CSI and generate a CSI report, which may be transmitted in a CSI report configured symbol 610 that may be included as one or more uplink symbols 645 allocated to the UE in uplink grant 640.

Figure 7:
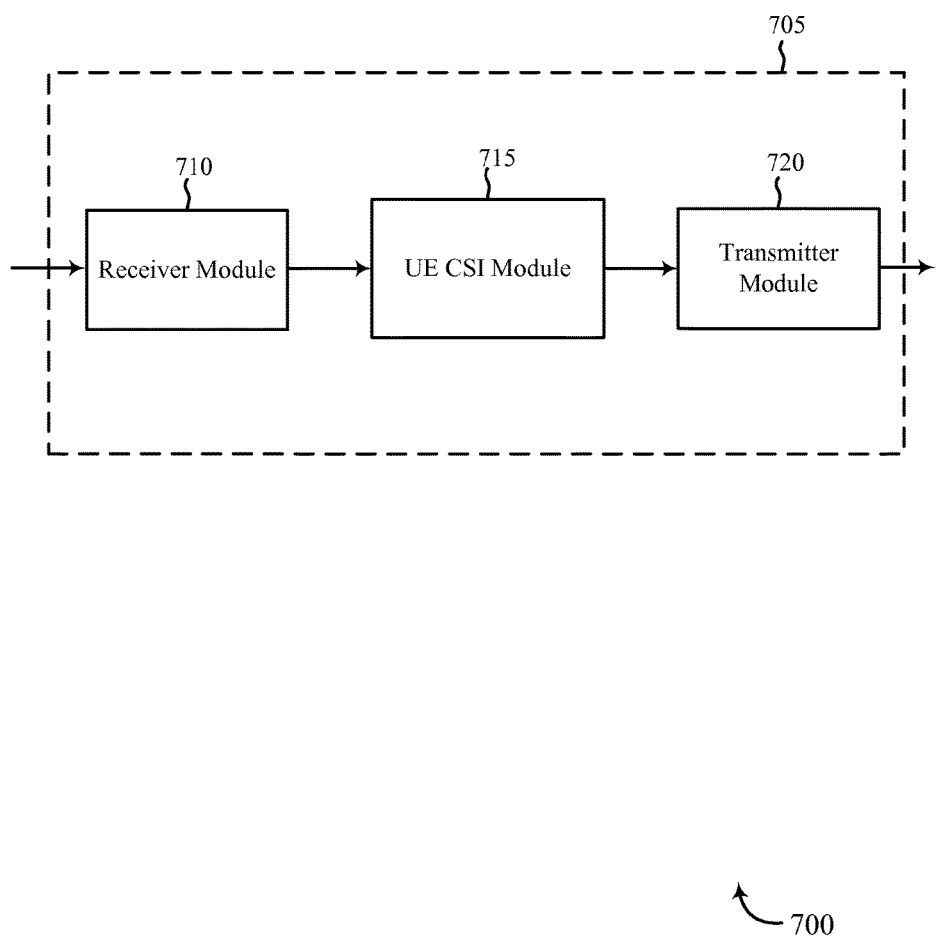
FIG. 7 shows a block diagram of a device configured for use in wireless communication, in accordance with various aspects of the present disclosure.

FIG. 7 shows a block diagram 700 of a device 705 for use in wireless communication, in accordance with various aspects of the present disclosure. The device 705 may be an example of one or more aspects of a UE 115 described with reference to FIG. 1. The device 705 may include a receiver module 710, a UE CSI module 715, and/or a transmitter module 720. The device 705 may also be, or include, a processor (not shown). Each of these modules may be in communication with each other.

The components of the device 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits (ICs). In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 710 may receive information such as packets, user data, and/or control information associated with various information channels (e.g., control channels, data channels, etc.). The receiver module 710 may be configured to receive CSI reference signals and other signals that may indicate a location of a CSI reference signal. Information may be passed on to the UE CSI module 715 and to other components of the device 705. The receiver module 710 may illustrate aspects of the transceiver module 935 described with reference to FIG. 9.

The UE CSI module 715 may be configured to determine CSI report information and designated or configured symbols for CSI RS and report transmissions, such as discussed above with respect to FIGS. 2-6. In some examples, the UE CSI module 715 may illustrate aspects of the processor module 905 described with reference to FIG. 9. The transmitter module 720 may transmit the one or more signals received from other components of the device 705. The transmitter module 720 may transmit uplink data and CSI reports, for example. In some examples, the transmitter module 720 may be collocated with the receiver module 710 in a transceiver module. The transmitter module 720 may illustrate aspects of the transceiver module 935 described with reference to FIG. 9.

Figure 8:
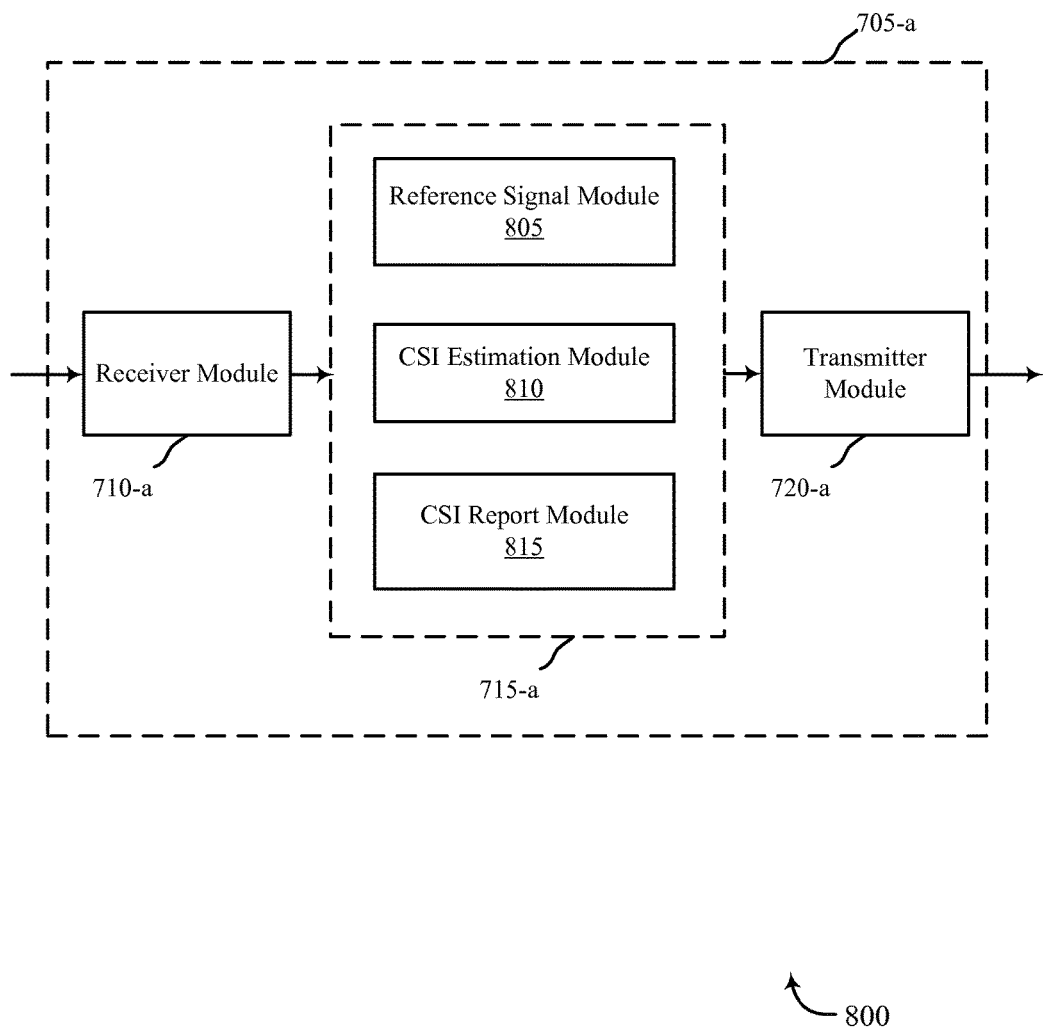
FIG. 8 shows a block diagram of a device configured for use in wireless communication, in accordance with various aspects of the present disclosure.

FIG. 8 shows a block diagram 800 of a device 705-*a* for use in wireless communication in accordance with various examples. The device 705-*a* may be an example of one or more aspects of a UE 115 described with reference to FIG. 1. It may also be an example of a device 705 described with reference to FIG. 7. The device 705-*a* may include a receiver module 710-*a*, a UE CSI module 715-*a*, and/or a transmitter module 720-*a*, which may be examples of the corresponding modules of device 705. The device 705-*a* may also include a processor (not shown). Each of these components may be in communication with each other. The UE CSI module 715-*a* may include a reference signal module 805, a CSI estimation module 810, and a CSI report module 815. The receiver module 710-*a* and the transmitter module 720-*a* may perform the functions of the receiver module 710 and the transmitter module 720, of FIG. 7, respectively.

The reference signal module 805 may determine a downlink symbol that includes a CSI reference signal, such as discussed above with respect to FIGS. 2-6. The CSI estimation module 810 may receive information from the CSI reference signal and may estimate CSI based on the reference signal, in a manner similar as discussed above with respect to FIGS. 2-6. The CSI report module 815 may transmit a CSI report in an uplink symbol and may determine when such a CSI report is to be transmitted, in a manner similar as discussed above with respect to FIGS. 2-6.

Figure 9:
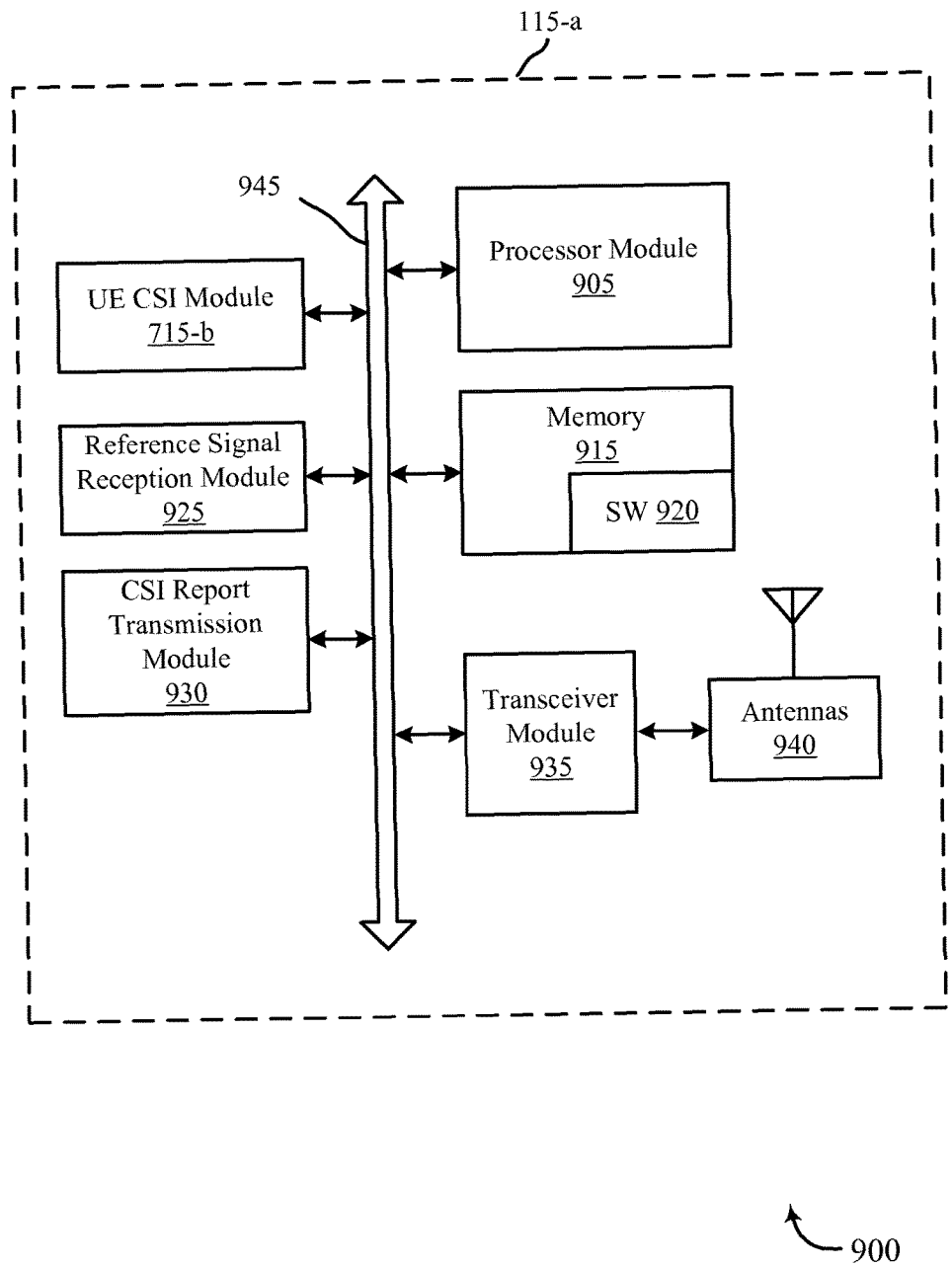
FIG. 9 shows a block diagram of a wireless communication system, in accordance with various aspects of the present disclosure.

FIG. 9 shows a system 900 for use in wireless communication in accordance with various examples. System 900 may include a UE 115-*a*, which may be an example of the UEs 115 of FIG. 1. UE 115-*a* may also be an example of one or more aspects of devices 705 of FIGS. 7 and 8.

The UE 115-*a* may generally include components for bi-directional voice and data communications including components for transmitting communications and components for receiving communications. The UE 115-*a* may include antenna(s) 940, a transceiver module 935, a processor module 905, and memory 915 (including software (SW) 920), which each may communicate, directly or indirectly, with each other (e.g., via one or more buses 945). The transceiver module 935 may be configured to communicate bi-directionally, via the antenna(s) 940 and/or one or more wired or wireless links, with one or more networks, as described above. For example, the transceiver module 935 may be configured to communicate bi-directionally with base stations 105 with reference to FIG. 1. The transceiver module 935 may include a modem configured to modulate the packets and provide the modulated packets to the antenna(s) 940 for transmission, and to demodulate packets received from the antenna(s) 940. While the UE 115-*a* may include a single antenna 940, the UE 115-*a* may have multiple antennas 940 capable of concurrently transmitting and/or receiving multiple wireless transmissions. The transceiver module 935 may be capable of concurrently communicating with one or more base stations 105 via multiple component carriers.

The UE 115-*a* may include a UE CSI module 715-*b*, which may perform the functions described above for the UE CSI modules 715 of device 705 of FIGS. 7 and 8. The UE 115-*a* may also include a reference signal reception module 925, which may receive CSI or other reference signals that may then be provided to the UE CSI module 715-*b*. In the example of FIG. 9, UE 115-*a* also includes CSI report transmission module 930, which may receive a CSI report from the UE CSI module 715-*b* and transmit the CSI report in an uplink symbol identified by the UE CSI module 715-*b*, in a manner similar as discussed above with respect to FIGS. 2-6.

The memory 915 may include random access memory (RAM) and read-only memory (ROM). The memory 915 may store computer-readable, computer-executable software/firmware code 920 containing instructions that are configured to, when executed, cause the processor module 905 to perform various functions described herein (e.g., determination of symbols for CSI reference signals and reports, CSI estimation, CSI report transmission, etc.). Alternatively, the computer-readable, computer-executable software/firmware code 920 may not be directly executable by the processor module 905 but be configured to cause a computer (e.g., when compiled and executed) to perform functions described herein. The processor module 905 may include an intelligent hardware device, e.g., a central processing unit (CPU), a microcontroller, an application-specific integrated circuit (ASIC), etc.

Figure 10:
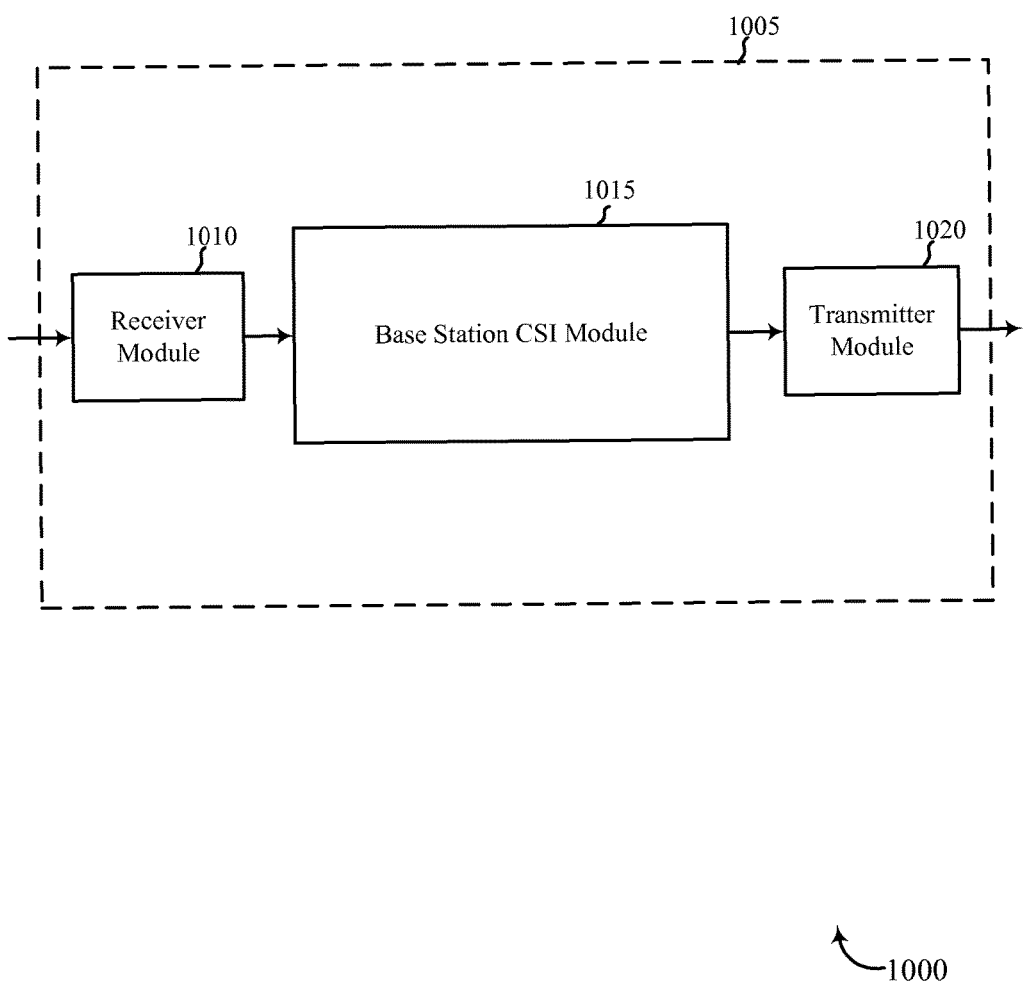
FIG. 10 shows a block diagram of an apparatus for use in wireless communication, in accordance with various aspects of the present disclosure.

FIG. 10 shows a block diagram 1000 of an apparatus 1005 for use in wireless communication, in accordance with various aspects of the present disclosure. In some examples, the apparatus 1005 may be an example of aspects of one or more of the base stations 105 described with reference to FIG. 1. In some examples, the apparatus 1005 may be part or include an LTE/LTE-A eNB and/or an LTE/LTE-A base station. The apparatus 1005 may also be a processor. The apparatus 1005 may include a receiver module 1010, a base station CSI module 1015, and/or a transmitter module 1020. Each of these modules may be in communication with each other.

The components of the apparatus 1005 may, individually or collectively, be implemented using one or more ASICs adapted to perform some or all of the applicable functions in hardware. Alternatively, the functions may be performed by one or more other processing units (or cores) on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory and formatted to be executed by one or more general or application-specific processors.

In some examples, the receiver module 1010 may include at least one radio frequency (RF) receiver, such as an RF receiver operable to receive CSI reports. The receiver module 1010 may be used to receive various types of data and/or control signals (i.e., transmissions) over one or more communication links of a wireless communication system, such as one or more communication links of the wireless communications system 100 described with reference to FIG. 1. The receiver module 1010 may illustrate aspects of the base station transceiver module 1250 described with reference to FIG. 12.

In some examples, the transmitter module 1020 may include at least one RF transmitter, such as at least one RF transmitter operable to transmit CSI reference signals, uplink and downlink grants, and other signaling to UEs. The transmitter module 1020 may be used to transmit various types of data and/or control signals (i.e., transmissions) over one or more communication links of a wireless communication system, such as one or more communication links of the wireless communications system 100 described with reference to FIG. 1. The transmitter module 1020 may illustrate aspects of the base station transceiver module 1250 described with reference to FIG. 12.

In some examples, the base station CSI module 1015 may be configured to determine CSI report information, determine designated or configured symbols for CSI RS and report transmissions, transmit control signaling indicating CSI RS symbols, and transmit uplink or downlink grants, such as discussed above with respect to FIGS. 2-6. In some examples, the base station CSI module 1015 may illustrate aspects of the base station processor module 1210 described with reference to FIG. 12.

Figure 11:
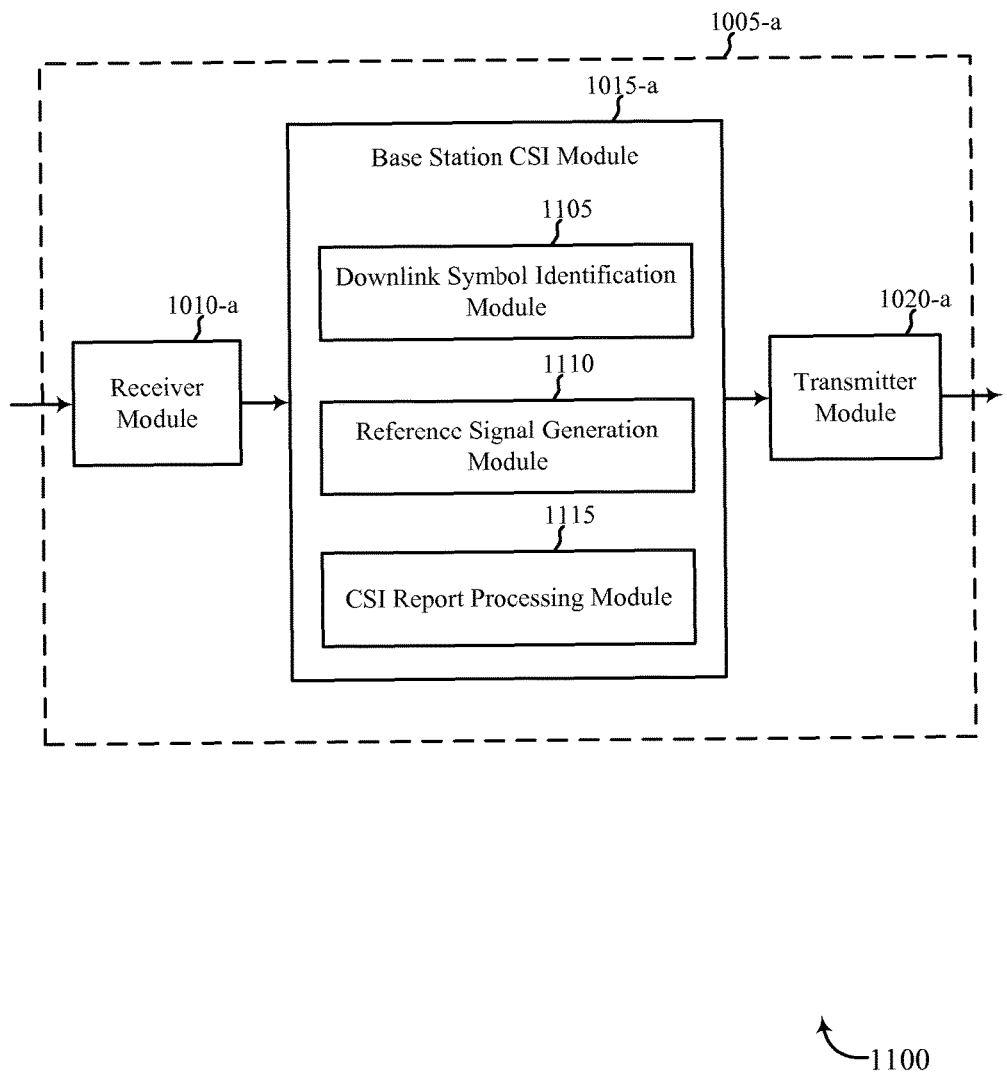
FIG. 11 shows a block diagram of an apparatus for use in wireless communication, in accordance with various aspects of the present disclosure.

FIG. 11 shows a block diagram 1100 of an apparatus 1005-a for use in wireless communication, in accordance with various aspects of the present disclosure. In some examples, the apparatus 1005-a may be an example of aspects of one or more of the base stations 105 described with reference to FIG. 1, and/or an example of aspects of the apparatus 1005 described with reference to FIG. 10. In some examples, the apparatus 1005-a may be part or include an LTE/LTE-A eNB and/or an LTE/LTE-A base station configured to transmit an eCC. The apparatus 1005-a may also be a processor. The apparatus 1005-a may include a receiver module 1010-a, a base station CSI module 1015-a, and/or a transmitter module 1020-a. Each of these modules may be in communication with each other.

The components of the apparatus 1005-a may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each component may also be implemented, in whole or in part, with instructions embodied in a memory and formatted to be executed by one or more general or application-specific processors.

In some examples, the receiver module 1010-a may be an example of one or more aspects of the receiver module 1010 described with reference to FIG. 10. In some examples, the receiver module 1010-a may include at least one radio frequency (RF) receiver, such as at least one RF receiver operable to receive CSI reports and other data transmitted in uplink symbols of an eCC. The receiver module 1010-a may be used to receive various types of data and/or control signals (i.e., transmissions) over one or more communication links of a wireless communication system, such as one or more communication links of the wireless communications system 100 described with reference to FIG. 1.

In some examples, the transmitter module 1020-a may be an example of one or more aspects of the transmitter module 1020 described with reference to FIG. 10. In some examples, the transmitter module 1020-a may include at least one RF transmitter, such as at least one RF transmitter operable to transmit CSI reference signals, uplink or downlink grants, and control information (e.g., RRC, SIB, or PDCCH signaling, etc.). The transmitter module 1020-a may be used to transmit various types of data and/or control signals (i.e., transmissions) over one or more communication links of a wireless communications system, such as one or more communication links of the wireless communications system 100 described with reference to FIG. 1.

The base station CSI module 1015-a may include a downlink symbol identification module 1105, a reference signal generation module 1110, and a CSI report processing module 1115. The receiver module 1010-a and the transmitter module 1020-a may perform the functions of the receiver module 1010 and the transmitter module 1020 of FIG. 10, respectively.

The downlink symbol identification module 1105 may determine a downlink symbol that is to include a CSI reference signal, such as discussed above with respect to FIGS. 2-6. The reference signal generation module 1110 may generate a CSI reference signal that may be used for CSI estimation, in a manner similar as discussed above with respect to FIGS. 2-6. The CSI report module 815 may receive a CSI report in an uplink symbol and may determine one or more parameters associated with channel characteristics of the UE, in a manner similar as discussed above with respect to FIGS. 2-6.

Figure 12:
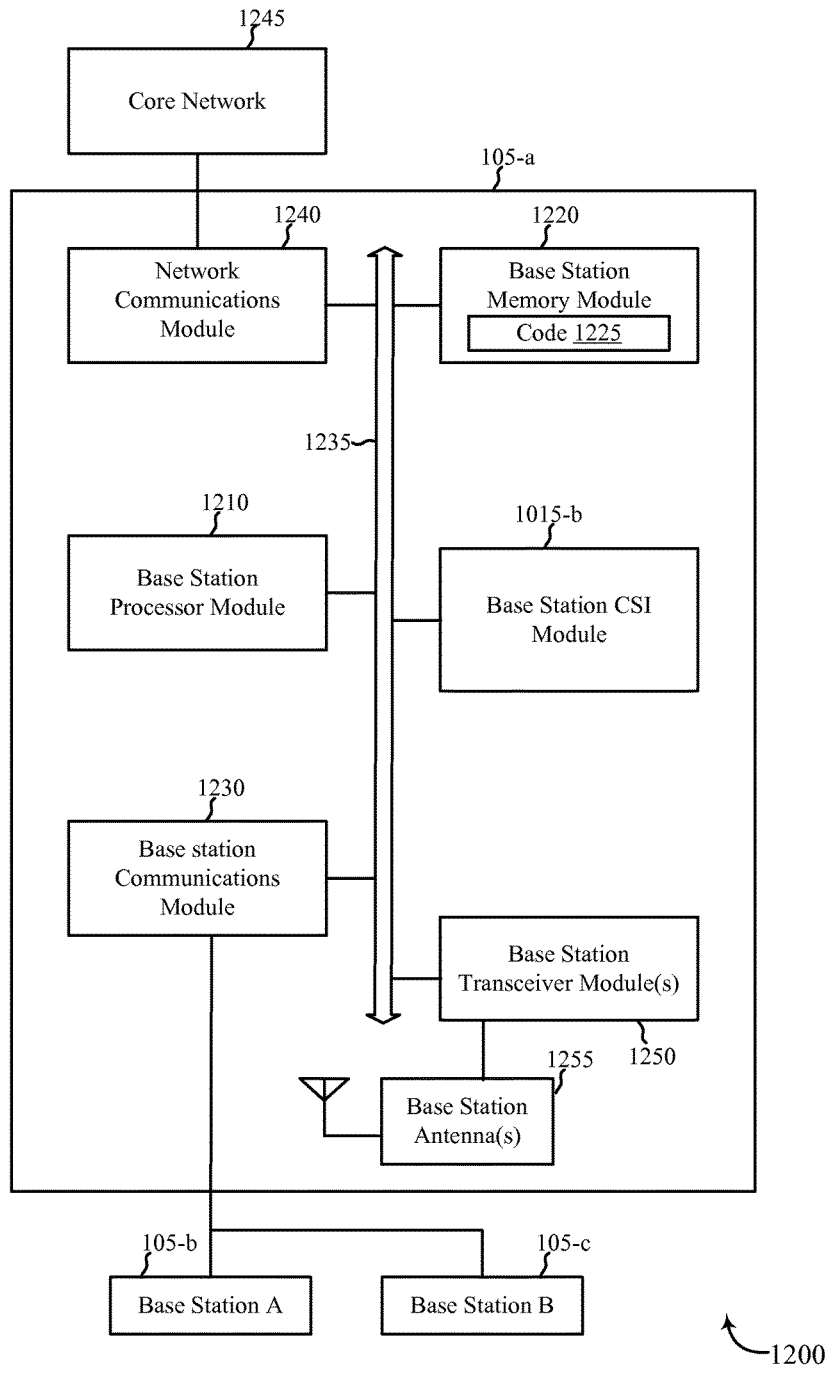
FIG. 12 shows a block diagram of a base station (e.g., a base station forming part or all of an eNB) for use in wireless communication, in accordance with various aspects of the present disclosure.

FIG. 12 shows a block diagram 1200 of a base station 105-a (e.g., a base station forming part or all of an eNB) for use in wireless communication, in accordance with various aspects of the present disclosure. In some examples, the base station 105-a may be an example of aspects of one or more of the base stations 105 described with reference to FIG. 1, and/or aspects of one or more of the apparatus 1005 when configured as a base station, as described with reference to FIGS. 10 and/or 11. The base station 105-a may be configured to implement or facilitate at least some of the base station and/or apparatus features and functions described with reference to FIGS. 2-6.

The base station 105-a may include a base station processor module 1210, a base station memory module 1220, at least one base station transceiver module (represented by base station transceiver module(s) 1250), at least one base station antenna (represented by base station antenna(s) 1255), and/or a base station CSI module 1015-b. The base station 105-a may also include one or more of a base station communications module 1230 and/or a network communications module 1240. Each of these modules may be in communication with each other, directly or indirectly, over one or more buses 1235.

The base station memory module 1220 may include random access memory (RAM) and/or read-only memory (ROM). The base station memory module 1220 may store computer-readable, computer-executable software/firmware code 1225 containing instructions that are configured to, when executed, cause the base station processor module 1210 to perform various functions described herein related to wireless communication (e.g., CSI reference signal downlink symbol location, CSI report symbol location, control signal generation, CSI report reception, determination and signaling of uplink and downlink grants, etc.). Alternatively, the computer-readable, computer-executable software/firmware code 1225 may not be directly executable by the base station processor module 1210 but be configured to cause the base station 105-*a* (e.g., when compiled and executed) to perform various of the functions described herein.

The base station processor module 1210 may include an intelligent hardware device, e.g., a central processing unit (CPU), a microcontroller, an ASIC, etc. The base station processor module 1210 may process information received through the base station transceiver module(s) 1250, the base station communications module 1230, and/or the network communications module 1240. The base station processor module 1210 may also process information to be sent to the transceiver module(s) 1250 for transmission through the antenna(s) 1255, to the base station communications module 1230, for transmission to one or more other base stations 105-*b* and 105-*c*, and/or to the network communications module 1240 for transmission to a core network 1245, which may be an example of one or more aspects of the core network 130 described with reference to FIG. 1. The base station processor module 1210 may handle, alone or in connection with the base station CSI module 1015-*b*, various aspects of variable length TTI management and CSI reference signal and report management as discussed herein.

The base station transceiver module(s) 1250 may include a modem configured to modulate packets and provide the modulated packets to the base station antenna(s) 1255 for transmission and to demodulate packets received from the base station antenna(s) 1255. The base station transceiver module(s) 1250 may, in some examples, be implemented as one or more base station transmitter modules and one or more separate base station receiver modules. The base station transceiver module(s) 1250 may support communications in a first radio frequency spectrum band and/or a second radio frequency spectrum band. The base station transceiver module(s) 1250 may be configured to communicate bi-directionally, via the antenna(s) 1255, with one or more UEs or apparatuses, such as one or more of the UEs 115 described with reference to FIGS. 1 and/or 9. The base station 105-*a* may, for example, include multiple base station antennas 1255 (e.g., an antenna array). The base station 105-*a* may communicate with the core network 1245 through the network communications module 1240. The base station 105-*a* may also communicate with other base stations, such as the base stations 105-*b* and 105-*c*, using the base station communications module 1230.

The base station CSI module 1015-*b* may be configured to perform and/or control some or all of the features and/or functions described with reference to FIGS. 2-6 related to variable length TTI and CSI reference signal and reporting management. The base station CSI module 1015-*b*, or portions of the base station CSI module 1015-*b*, may include a processor, and/or some or all of the functions of the base station CSI module 1015-*b* may be performed by the base station processor module 1210 and/or in connection with the base station processor module 1210. In some examples, the base station CSI module 1015-*b* may be an example of the base station CSI module 1015 and/or 1015-*a* described with reference to FIGS. 10 and/or 11.

Figure 13:
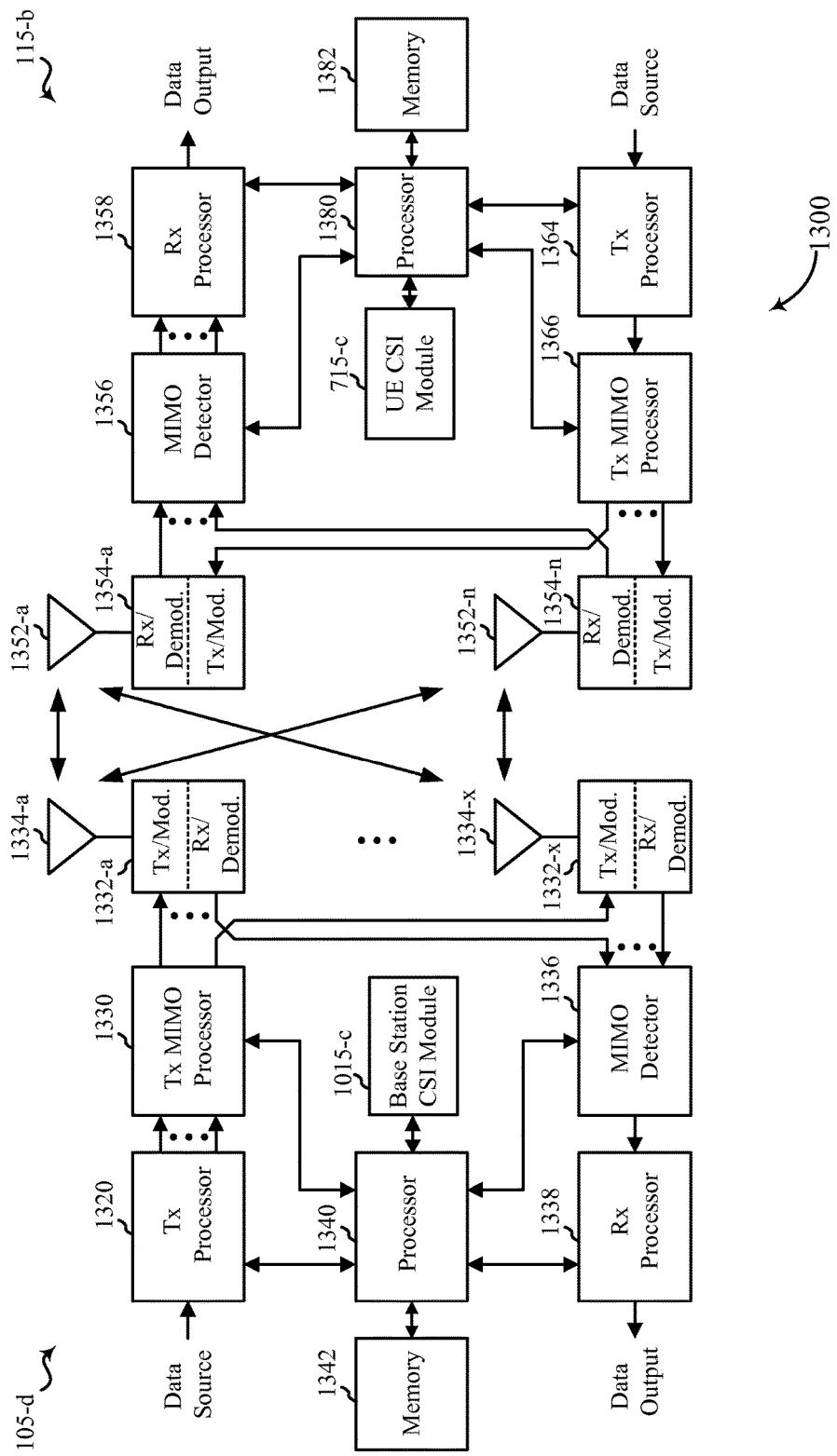
FIG. 13 shows a block diagram of a multiple-input/multiple-output communication system, in accordance with various aspects of the present disclosure.

FIG. 13 is a block diagram of a multiple input/multiple output (MIMO) communications system 1300 including a base station 105-*d* and a UE 115-*b*. The MIMO communications system 1300 may illustrate aspects of the wireless communications system 100 shown in FIG. 1. The base station 105-*d* may be equipped with antennas 1334-*a* through 1334-*x*, and the UE 115-*b* may be equipped with antennas 1352-*a* through 1352-*n*. In the MIMO communications system 1300, the base station 105-*d* may be able to send data over multiple communication links at the same time. Each communication link may be called a "layer" and the "rank" of the communication link may indicate the number of layers used for communication. For example, in a 2×2 MIMO communications system where base station 105-*d* transmits two "layers," the rank of the communication link between the base station 105-*d* and the UE 115-*b* is two.

At the base station 105-*d*, a transmit processor 1320 may receive data from a data source. The transmit processor 1320 may process the data. The transmit processor 1320 may also generate control symbols and/or reference symbols. A transmit MIMO processor 1330 may perform spatial processing (e.g., precoding) on data symbols, control symbols, and/or reference symbols, if applicable, and may provide output symbol streams to the transmit modulators/demodulators 1332-*a* through 1332-*x*. Each modulator/demodulator 1332 may process a respective output symbol stream (e.g., for OFDM, etc.) to obtain an output sample stream. Each modulator/demodulator 1332 may further process (e.g., convert to analog, amplify, filter, and upconvert) the output sample stream to obtain a DL signal. In one example, DL signals from modulators/demodulators 1332-*a* through 1332-*x* may be transmitted via the antennas 1334-*a* through 1334-*x*, respectively. The transmit processor 1320, transmit MIMO processor 1330, transmit modulators/demodulators 1332, or antennas 1334, or some combination of these components, may illustrate aspects of base station transceiver module 1250 and base station antennas 1255 described with reference to FIG. 12.

At the UE 115-*b*, the UE antennas 1352-*a* through 1352-*n* may receive the DL signals from the base station 105-*d* and may provide the received signals to the demodulators 1354-*a* through 1354-*n*, respectively. Each demodulator 1354 may condition (e.g., filter, amplify, downconvert, and digitize) a respective received signal to obtain input samples. Each demodulator 1354 may further process the input samples (e.g., for OFDM, etc.) to obtain received symbols. A MIMO detector 1356 may obtain received symbols from all the demodulators 1354-*a* through 1354-*n*, perform MIMO detection on the received symbols, if applicable, and provide detected symbols. A receive processor 1358 may process (e.g., demodulate, deinterleave, and decode) the detected symbols, providing decoded data for the UE 115-*b* to a data output, and provide decoded control information to a processor 1380, or memory 1382. The receive processor 1358, MIMO detector 1356, demodulators 1354, or antennas 1352, or some combination of these components, may illustrate aspects of transceiver module 935 and antennas 940 described with reference to FIG. 9.

The processor 1380 may in some cases execute stored instructions to instantiate one or more of a UE CSI module 715-c. The UE CSI module 715-c may be an example of aspects of the UE CSI module 715 described with reference to FIGS. 7, 8 and/or 9.

On the uplink (UL), at the UE 115-b, a transmit processor 1364 may receive and process data from a data source. The transmit processor 1364 may also generate reference symbols for a reference signal. The symbols from the transmit processor 1364 may be precoded by a transmit MIMO processor 1366 if applicable, further processed by the demodulators 1354-a through 1354-n (e.g., for SC-FDMA, etc.), and be transmitted to the base station 105-d in accordance with the transmission parameters received from the base station 105-d. The transmit processor 1364 or transmit MIMO processor 1366, or both, may illustrate aspects of transceiver module 935 described with reference to FIG. 9.

At the base station 105-d, the UL signals from the UE 115-b may be received by the antennas 1334, processed by the modulators/demodulators 1332, detected by a MIMO detector 1336 if applicable, and further processed by a receive processor 1338. The receive processor 1338 may provide decoded data to a data output and to the processor 1340 and/or memory 1342. The processor 1340 may in some cases execute stored instructions to instantiate one or more of a base station CSI module 1015-c. The base station CSI module 1015-c may be an example of aspects of the base station CSI module 1015 described with reference to FIGS. 10, 11 and/or 12. The receive processor 1338 or MIMO detector 1336, or both, may illustrate aspects of base station transceiver module 1250 described with reference to FIG. 12.

The components of the UE 115-b may, individually or collectively, be implemented with one or more ASICs adapted to perform some or all of the applicable functions in hardware. Each of the noted modules may be a means for performing one or more functions related to operation of the MIMO communications system 1300. Similarly, the components of the base station 105-c may, individually or collectively, be implemented with one or more ASICs adapted to perform some or all of the applicable functions in hardware. Each of the noted components may be a means for performing one or more functions related to operation of the MIMO communications system 1300.

Figure 14:
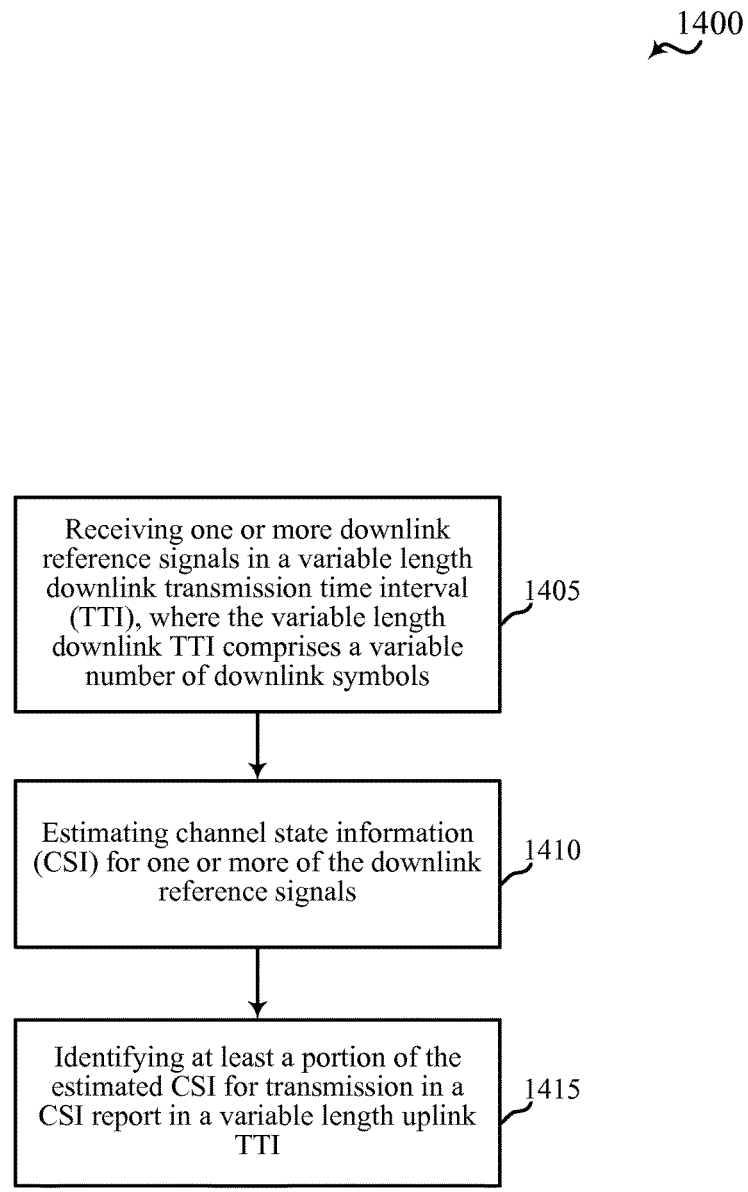
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs 115 described with reference to FIGS. 1, 9 and/or 13, and/or aspects of one or more of the devices 705 described with reference to FIGS. 7 and/or 8. In some examples, a UE may execute one or more sets of codes to control the functional elements of the UE to perform the functions described below. Additionally or alternatively, the UE may perform one or more of the functions described below using special-purpose hardware.

At block 1405, the method 1400 may include receiving one or more downlink reference signals in a variable length downlink TTI. The variable length downlink TTI may comprise a variable number of downlink symbols. The operations at block 1405 may be performed using the UE CSI module 715 described with reference to FIGS. 7-9 and/or 13. In some examples, the operations at block 1405 may be performed using the antennas 940 and transceiver module 935 described with reference to FIG. 9.

At block 1410, the method 1400 may include estimating channel state information (CSI) for one or more of the downlink reference signals. The operations at block 1410 may be performed using the UE CSI module 715 described with reference to FIGS. 7-9 and/or 13. In some examples, the operations at block 1410 may be performed using the memory 915 and processor module 905 described with reference to FIG. 9.

At block 1415, the method 1400 may include identifying at least a portion of the estimated CSI for transmission in a CSI report in a variable length uplink TTI. The operations at block 1415 may be performed using the UE CSI module 715 described with reference to FIGS. 7-9 and/or 13. In some examples, the operations at block 1415 may be performed using the memory 915 and processor module 905 described with reference to FIG. 9.

Thus, the method 1400 may provide for wireless communication. It should be noted that the method 1400 is just one implementation and that the operations of the method 1400 may be rearranged or otherwise modified such that other implementations are possible.

Figure 15:
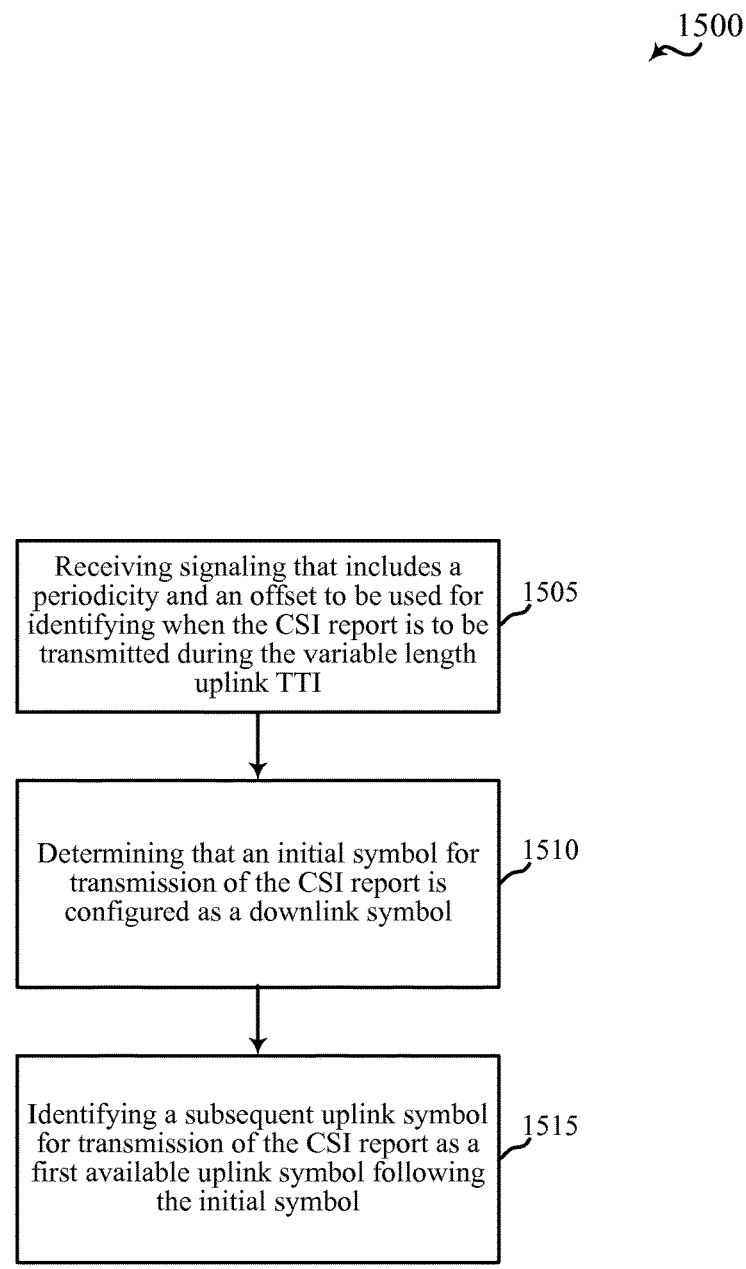
FIG. 15 is a flow chart illustrating another example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115 described with reference to FIGS. 1, 9 and/or 13, and/or aspects of one or more of the devices 705 described with reference to FIGS. 7 and/or 8. In some examples, a UE may execute one or more sets of codes to control the functional elements of the UE to perform the functions described below. Additionally or alternatively, the UE may perform one or more of the functions described below using special-purpose hardware.

At block 1505, the method 1500 may include receiving signaling that includes a periodicity and an offset to be used for identifying when the CSI report is to be transmitted during the variable length uplink TTI. The operations at block 1505 may be performed using the UE CSI module 715 described with reference to FIGS. 7-9 and/or 13. In some examples, the operations at block 1505 may be performed using the antennas 940 and transceiver module 935 described with reference to FIG. 9.

At block 1510, the method 1500 may include determining that an initial symbol for transmission of the CSI report is configured as a downlink symbol. The operations at block 1510 may be performed using the UE CSI module 715 described with reference to FIGS. 7-9 and/or 13. In some examples, the operations at block 1510 may be performed using the memory 915 and processor module 905 described with reference to FIG. 9.

At block 1515, the method 1500 may include identifying a subsequent uplink symbol for transmission of the CSI report as a first available uplink symbol following the initial symbol. The operations at block 1515 may be performed using the UE CSI module 715 described with reference to FIGS. 7-9 and/or 13. In some examples, the operations at block 1515 may be performed using the memory 915 and processor module 905 described with reference to FIG. 9.

Thus, the method 1500 may provide for wireless communication. It should be noted that the method 1500 is just one implementation and that the operations of the method 1500 may be rearranged or otherwise modified such that other implementations are possible.

Figure 16:
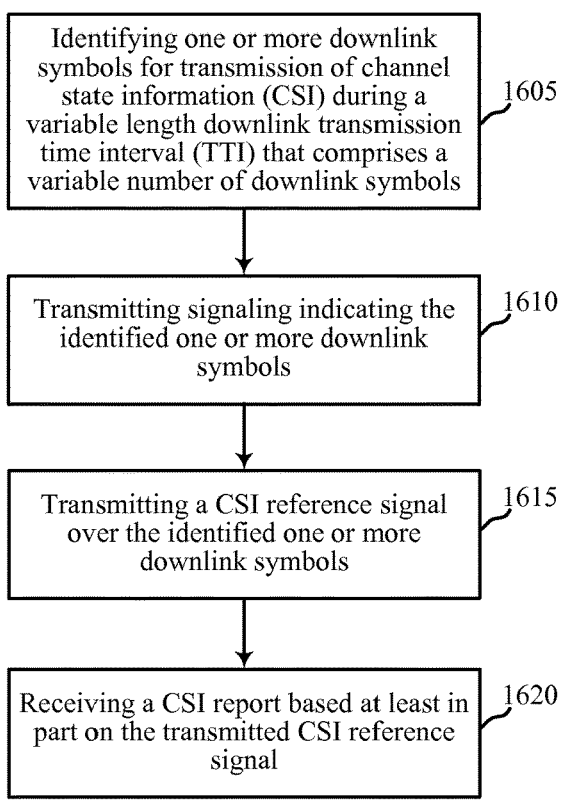
FIG. 16 is a flow chart illustrating another example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the base stations 105 described with reference to FIGS. 1, 12 and/or 13, and/or aspects of one or more of the apparatuses 1005 described with reference to FIGS. 10 and/or 11. In some examples, a UE may execute one or more sets of codes to control the functional elements of the base station to perform the functions described below. Additionally or alternatively, the base station may perform one or more of the functions described below using special-purpose hardware.

At block 1605, the method 1600 may include identifying one or more downlink symbols for transmission of CSI during a variable length downlink TTI that comprises a variable number of downlink symbols. The operation(s) at block 1605 may be performed using the base station CSI module 1015 described with reference to FIGS. 10-13. In some examples, the operations at block 1605 may be performed using the base station memory module 1220 and the base station processor module 1210 as described with reference to FIG. 12.

At block 1610, the method 1600 may include transmitting signaling indicating the identified one or more downlink symbols. The operations at block 1610 may be performed using the base station CSI module 1015 described with reference to FIGS. 10-13. In some examples, the operations at block 1610 may be performed using the base station transceiver module 1250 and the base station antennas 1255 as described with reference to FIG. 12.

At block 1615, the method 1600 may include transmitting a CSI reference signal over the identified one or more downlink symbols. The operations at block 1615 may be performed using the base station CSI module 1015 described with reference to FIGS. 10-13. In some examples, the operations at block 1615 may be performed using the base station transceiver module 1250 and the base station antennas 1255 as described with reference to FIG. 12.

At block 1620, the method 1600 may include receiving a CSI report based at least in part on the transmitted CSI reference signal. The operations at block 1620 may be performed using the base station CSI module 1015 described with reference to FIGS. 10-13. In some examples, the operations at block 1620 may be performed using the base station antennas 1255 and the base station transceiver module 1250 as described with reference to FIG. 12.

Thus, the method 1600 may provide for wireless communication. It should be noted that the method 1600 is just one implementation and that the operations of the method 1600 may be rearranged or otherwise modified such that other implementations are possible.

Figure 17:
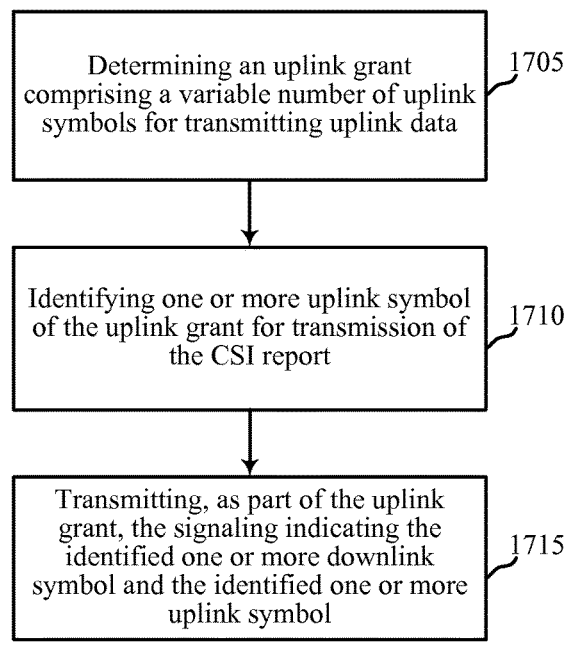
FIG. 17 is a flow chart illustrating another example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the base stations 105 described with reference to FIGS. 1, 12 and/or 13, and/or aspects of one or more of the apparatuses 1005 described with reference to FIGS. 10 and/or 11. In some examples, a UE may execute one or more sets of codes to control the functional elements of the base station to perform the functions described below. Additionally or alternatively, the base station may perform one or more of the functions described below using special-purpose hardware.

At block 1705, the method 1700 may include determining an uplink grant comprising a variable number of uplink symbols for transmitting uplink data. The operations at block 1705 may be performed using the base station CSI module 1015 described with reference to FIGS. 10-13. In some examples, the operations at block 1705 may be performed using the base station memory module 1220 and the base station processor module 1210 as described with reference to FIG. 12.

At block 1710, the method 1700 may include identifying one or more uplink symbol of the uplink grant for transmission of the CSI report. The operations at block 1710 may be performed using the base station CSI module 1015 described with reference to FIGS. 10-13. In some examples, the operations at block 1710 may be performed using the base station memory module 1220 and the base station processor module 1210 as described with reference to FIG. 12.

At block 1715, the method 1700 may include transmitting, as part of the uplink grant, the signaling indicating the identified one or more downlink symbol and the identified one or more uplink symbol. The operations at block 1715 may be performed using the base station CSI module 1015 described with reference to FIGS. 10-13. In some examples, the operations at block 1715 may be performed using the base station transceiver module 1250 and the base station antennas 1255 as described with reference to FIG. 12.

Thus, the method 1700 may provide for wireless communication. It should be noted that the method 1700 is just one implementation and that the operations of the method 1700 may be rearranged or otherwise modified such that other implementations are possible.

In some examples, aspects from two or more of the methods 1400, 1500, 1600, or 1700 may be combined. It should be noted that the methods 1400, 1500, 1600, 1700 are just example implementations, and that the operations of the methods 1400-1700 may be rearranged or otherwise modified such that other implementations are possible.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (WiFi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed and/or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C, or any combination thereof" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communication, comprising:
   receiving one or more downlink reference signals in a variable length downlink transmission time interval (TTI), wherein the variable length downlink TTI comprises a variable number of downlink symbols;
   receiving signaling that includes a periodicity and an offset to be used for identifying when a channel state information (CSI) report is to be transmitted;
   estimating CSI for at least one of the one or more downlink reference signals;
   identifying at least a portion of the estimated CSI for transmission in the CSI report in a variable length uplink TTI; and
   determining that an initial symbol for transmission of the CSI report is configured as a downlink symbol, wherein the identifying further comprises identifying a subsequent uplink symbol for transmission of the CSI report as a first available uplink symbol following the initial symbol.

2. The method of claim 1, wherein the receiving the one or more downlink reference signals further comprises:
   receiving an uplink grant comprising a variable number of uplink symbols and an indication that the CSI report is to be transmitted on a physical uplink shared channel (PUSCH) in one or more of the uplink symbols.

3. The method of claim 1, wherein the signaling comprises radio resource control (RRC) signaling.

4. The method of claim 1, further comprising:
   skipping transmitting the CSI report.

5. The method of claim 4, wherein the identifying further comprises identifying a subsequent symbol for transmission of a subsequent CSI report for a reference signal received in one or more subsequent downlink symbols.

6. The method of claim 1, further comprising:
   transmitting the CSI report on one or more of a physical uplink control channel (PUCCH) or a physical uplink shared channel (PUSCH), wherein the transmission on the PUCCH or PUSCH is determined based on at least one of a user equipment (UE) capability, a radio resource control (RRC) configuration of the UE, or whether the UE receives an uplink UL grant to transmit PUSCH data during the variable length uplink TTI, or a combination thereof.

7. An apparatus for wireless communication, comprising:
means for receiving one or more downlink reference signals in a variable length downlink transmission time interval (TTI), wherein the variable length downlink TTI comprises a variable number of downlink symbols;
means for receiving signaling that includes a periodicity and an offset to be used for identifying when a channel state information (CSI) report is to be transmitted;
means for estimating CSI for at least one of the one or more downlink reference signals;
means for identifying at least a portion of the estimated CSI for transmission in the CSI report in a variable length uplink TTI; and
means for determining that an initial symbol for transmission of the CSI report is configured as a downlink symbol, wherein the means for identifying is operable to identify a subsequent uplink symbol for transmission of the CSI report as a first available uplink symbol following the initial symbol.

8. The apparatus of claim 7, wherein the means for receiving the one or more downlink reference signals is operable to receive an uplink grant comprising a variable number of uplink symbols and an indication that the CSI report is to be transmitted on a physical uplink shared channel (PUSCH) in one or more of the uplink symbols.

9. The apparatus of claim 7, wherein the signaling comprises radio resource control (RRC) signaling.

10. The apparatus of claim 7, further comprising:
means for skipping transmitting the CSI report.

11. The apparatus of claim 7, further comprising:
means for transmitting the CSI report on one or more of a physical uplink control channel (PUCCH) or a physical uplink shared channel (PUSCH), wherein the transmission on the PUCCH or PUSCH is determined based on at least one of a user equipment (UE) capability, a radio resource control (RRC) configuration of the UE, or whether the UE receives an uplink UL grant to transmit PUSCH data during the variable length uplink TTI, or a combination thereof.

12. An apparatus for wireless communication, comprising:
a processor;
memory in electronic communication with the processor; and
instructions stored in the memory, the instructions being executable by the processor to cause the apparatus to:
receive one or more downlink reference signals in a variable length downlink transmission time interval (TTI), wherein the variable length downlink TTI comprises a variable number of downlink symbols;
receive signaling that includes a periodicity and an offset to be used for identifying when a channel state information (CSI) report is to be transmitted;
estimate CSI for at least one of the one or more downlink reference signals;
identify at least a portion of the estimated CSI for transmission in the CSI report in a variable length uplink TTI; and
determine that an initial symbol for transmission of the CSI report is configured as a downlink symbol, wherein the instructions are further executable to identify a subsequent uplink symbol for transmission of the CSI report as a first available uplink symbol following the initial symbol.

13. The apparatus of claim 12, wherein the instructions are further executable by the processor to cause the apparatus to:
receive an uplink grant comprising a variable number of uplink symbols and an indication that the CSI report is to be transmitted on a physical uplink shared channel (PUSCH) in one or more of the uplink symbols.

14. The apparatus of claim 12, wherein the signaling comprises radio resource control (RRC) signaling.

15. The apparatus of claim 12, wherein the instructions are further executable by the processor to cause the apparatus to:
skip transmitting the CSI report.

16. The apparatus of claim 12, wherein the instructions are further executable by the processor to cause the apparatus to:
identify a subsequent symbol for transmission of a subsequent CSI report for a reference signal received in one or more subsequent downlink symbol.

17. The apparatus of claim 12, wherein the instructions are further executable by the processor to cause the apparatus to:
transmit the CSI report on one or more of a physical uplink control channel (PUCCH) or a physical uplink shared channel (PUSCH), wherein the transmission on the PUCCH or PUSCH is determined based on at least one of a user equipment (UE) capability, a radio resource control (RRC) configuration of the UE, or whether the UE receives an uplink UL grant to transmit PUSCH data during the variable length uplink TTI, or a combination thereof.

18. A non-transitory computer-readable medium storing computer-executable code for wireless communication, the code executable to:
receive one or more downlink reference signals in a variable length downlink transmission time interval (TTI), wherein the variable length downlink TTI comprises a variable number of downlink symbols;
receive signaling that includes a periodicity and an offset to be used for identifying when a channel state information (CSI) report is to be transmitted;
estimate CSI for at least one of the one or more downlink reference signals;
identify at least a portion of the estimated CSI for transmission in the CSI report in a variable length uplink TTI; and
determine that an initial symbol for transmission of the CSI report is configured as a downlink symbol, wherein the code is further executable to identify a subsequent uplink symbol for transmission of the CSI report as a first available uplink symbol following the initial symbol.

19. The non-transitory computer-readable medium of claim 18, wherein the code is further executable to:
receive an uplink grant comprising a variable number of uplink symbols and an indication that the CSI report is to be transmitted on a physical uplink shared channel (PUSCH) in one or more of the uplink symbols.

20. The non-transitory computer-readable medium of claim 18, wherein the signaling comprises radio resource control (RRC) signaling.

21. The non-transitory computer-readable medium of claim 18, wherein the code is further executable to:
skip transmitting the CSI report.

22. The non-transitory computer-readable medium of claim 18, wherein the code is further executable to:
transmit the CSI report on one or more of a physical uplink control channel (PUCCH) or a physical uplink shared channel (PUSCH), wherein the transmission on the PUCCH or PUSCH is determined based on at least one of a user equipment (UE) capability, a radio resource control (RRC) configuration of the UE, or whether the UE receives an uplink UL grant to transmit PUSCH data during the variable length uplink TTI, or a combination thereof.

* * * * *